US008628087B2

(12) United States Patent (10) Patent No.: US 8,628,087 B2
Knowlton et al. (45) Date of Patent: Jan. 14, 2014

(54) PERSONALIZED MOSAIC PUZZLE SET

(76) Inventors: Kenneth C. Knowlton, Budd Lake, NJ (US); Mark Setteducati, New York, NY (US); Hiroshi Kondo, Tokyo (JP)

( * ) Notice: Subject to any disclaimer, the term of this patent is extended or adjusted under 35 U.S.C. 154(b) by 47 days.

(21) Appl. No.: 13/176,742

(22) Filed: Jul. 5, 2011

(65) Prior Publication Data
US 2012/0025462 A1 Feb. 2, 2012

Related U.S. Application Data

(63) Continuation-in-part of application No. PCT/US2010/020280, filed on Jan. 6, 2010.

(60) Provisional application No. 61/253,012, filed on Oct. 19, 2009.

(30) Foreign Application Priority Data

Jan. 6, 2009 (JP) .................... 2009-001127

(51) Int. Cl.
*A63F 9/10* (2006.01)
(52) U.S. Cl.
USPC .................... 273/157 R; 273/153 R
(58) Field of Classification Search
USPC ............... 463/9; 273/153 R, 157 R
See application file for complete search history.

(56) References Cited

U.S. PATENT DOCUMENTS

| 1,960,216 | A | * | 5/1934 | Schacht | 273/157 R |
| 2,201,724 | A | * | 5/1940 | Gable | 273/160 |
| 3,547,444 | A | * | 12/1970 | Williams et al. | 273/294 |
| 4,053,159 | A | * | 10/1977 | Kulak | 273/157 R |
| 4,361,328 | A | * | 11/1982 | Stein et al. | 273/156 |
| 4,398,890 | A | | 8/1983 | Knowlton | |
| 5,267,863 | A | | 12/1993 | Simmons, Jr. et al. | |
| 5,368,301 | A | * | 11/1994 | Mitchell | 273/157 R |
| 5,605,332 | A | * | 2/1997 | Harnett | 273/157 R |

(Continued)

FOREIGN PATENT DOCUMENTS

FR 2733940 11/1996
WO WO 2007/022781 A2 3/2007

OTHER PUBLICATIONS

International Preliminary Examination Report on Patentability for parent PCT/US2010/020280 issued on Jul. 12, 2011.
American Gothic Woman Published 2002 by Knowlton.

(Continued)

*Primary Examiner* — Tramar Harper
(74) *Attorney, Agent, or Firm* — Robert W. J. Usher

(57) ABSTRACT

A mosaic puzzle set has a predetermined number of pieces (45) with unique, directionally visible, identifiers and different brightness characteristics, three for grey scale and five for color, comprising average brightness(es), and direction and magnitude of brightness gradients, enabling assembly to copy any user selected target picture (30) by following a dedicated table/chart (33). An internet server (1) storing piece characteristics and accessible for target picture upload and chart download by an access code in the purchased set, divides (S11) the target picture (30) into a same number of data areas (311) as pieces, analyzes their brightness characteristics and assembles the chart (33) by provisionally assigning pieces to respective target areas (311) and exchanging them for each other when sums of respective mismatch values between pieces and respective target areas are thereby reduced (S12-S14). Alternatively, pieces are divisions of an iconic source picture or only screen images. Pieces in a humped brightness histogram, population distribution provide greater detail. A grid-form tray supports and aligns pieces during assembly. Internet (2) billing is possible.

33 Claims, 35 Drawing Sheets

(56) References Cited

U.S. PATENT DOCUMENTS

| | | | |
|---|---|---|---|
| 6,102,796 A * | 8/2000 | Pajitnov et al. | 463/9 |
| 6,137,498 A | 10/2000 | Silvers | |
| 6,927,874 B1 | 8/2005 | Enokida et al. | |
| 7,092,899 B2 | 8/2006 | Simas et al. | |
| 2002/0183112 A1 * | 12/2002 | Emmerson et al. | 463/41 |

OTHER PUBLICATIONS

American Gothic Man Published 2002 by Knowlton.
American Gothic Web Published 2002 by Knowlton.

* cited by examiner

Figure 3
(a)
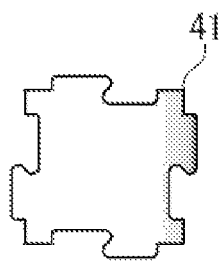
41
(b)
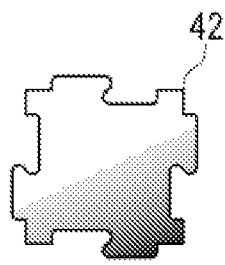
42
(c)
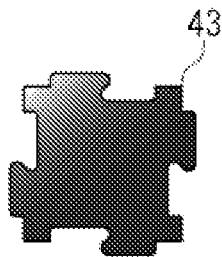
43
(d)
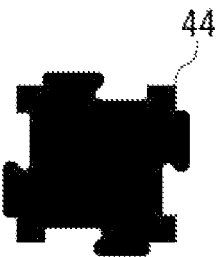
44

Figure 5
(a)
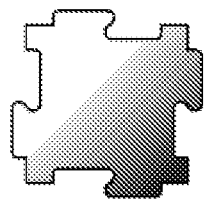
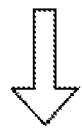 Rotated right 90 degrees
(b)
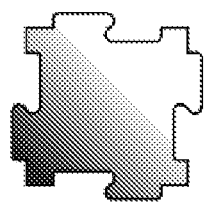
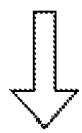 Rotated right 90 degrees
(c)
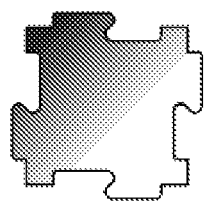
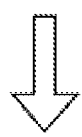 Rotated right 90 degrees
(d)
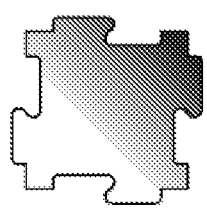

Figure 6
(a)
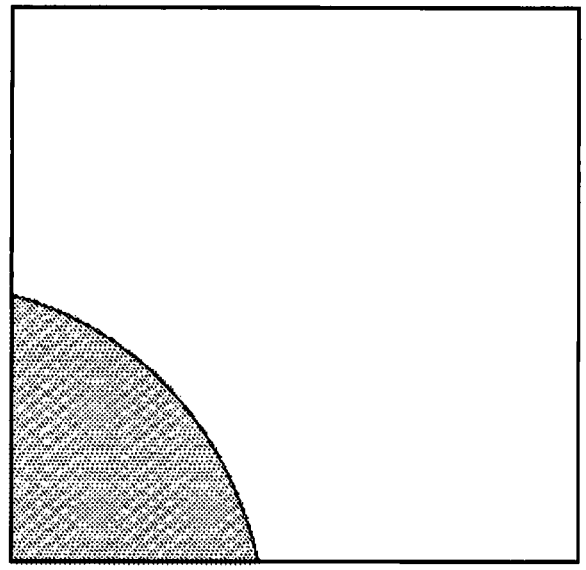
Regional image data
(b)
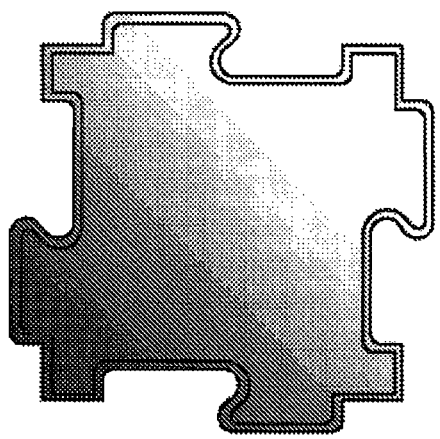
Reproduction by piece

Figure 7
(a)
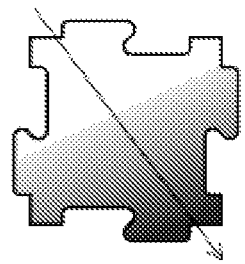
(b)
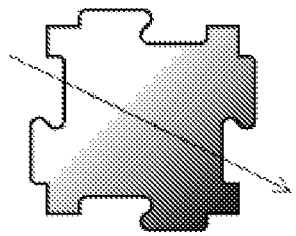
(c)
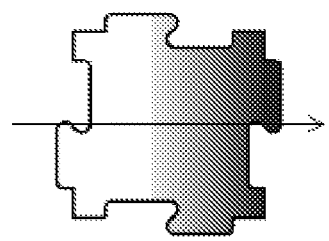

Figure 10
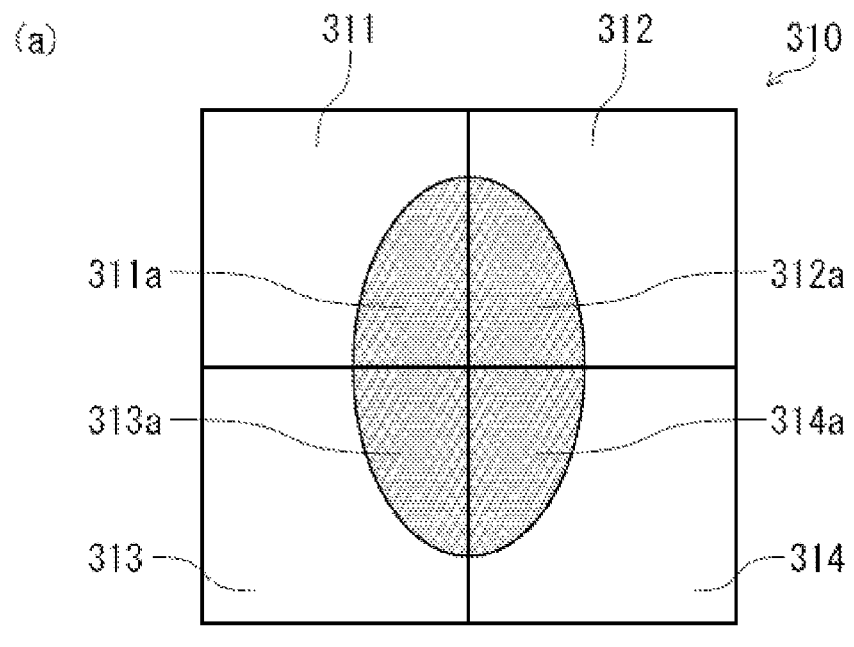
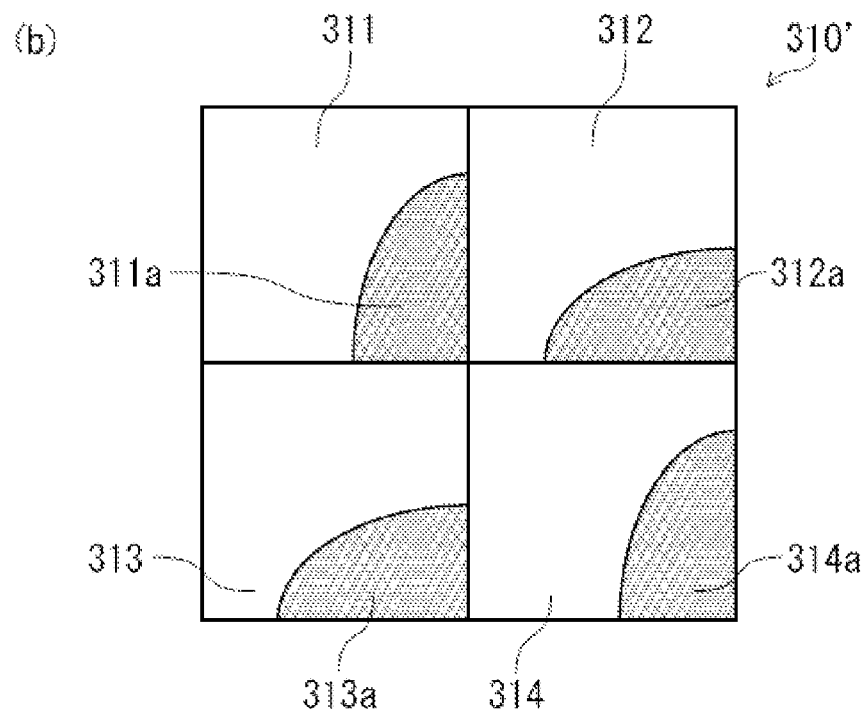

Figure 11
(a)
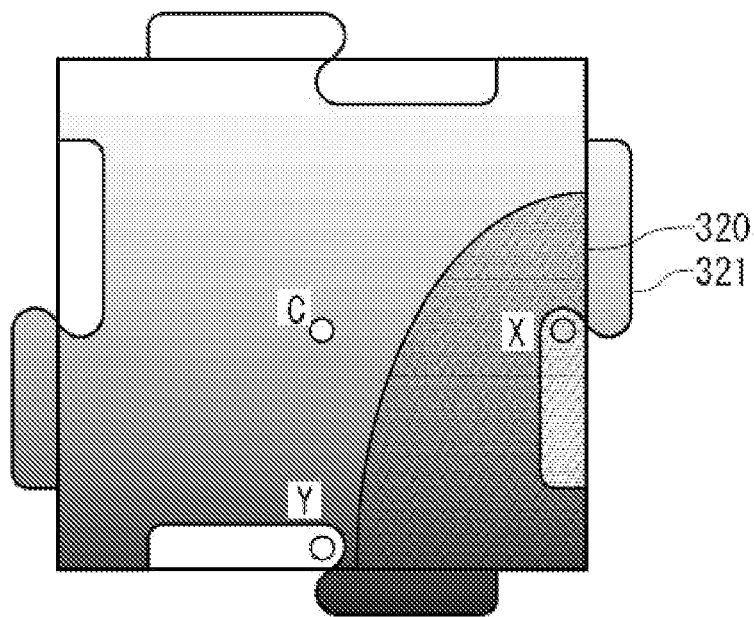
(b)
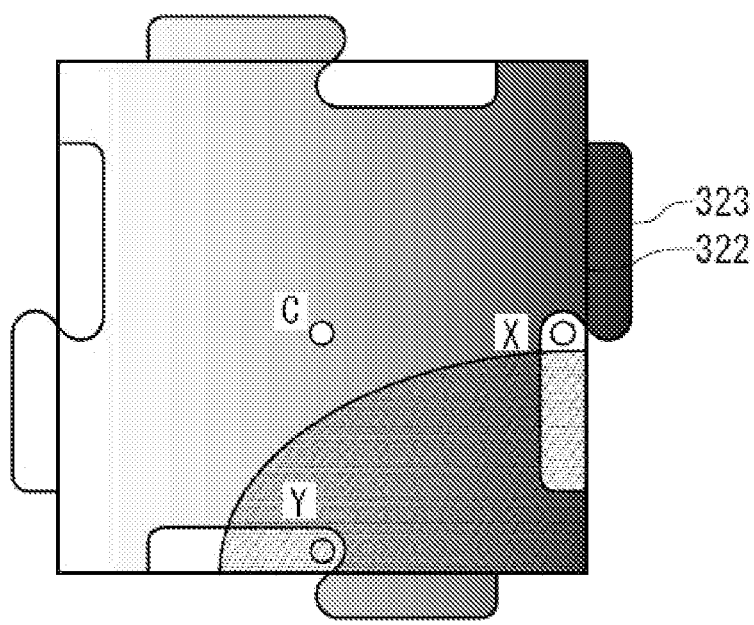

c = average brightness
d → tile distance

FIG 28a FIG 28b
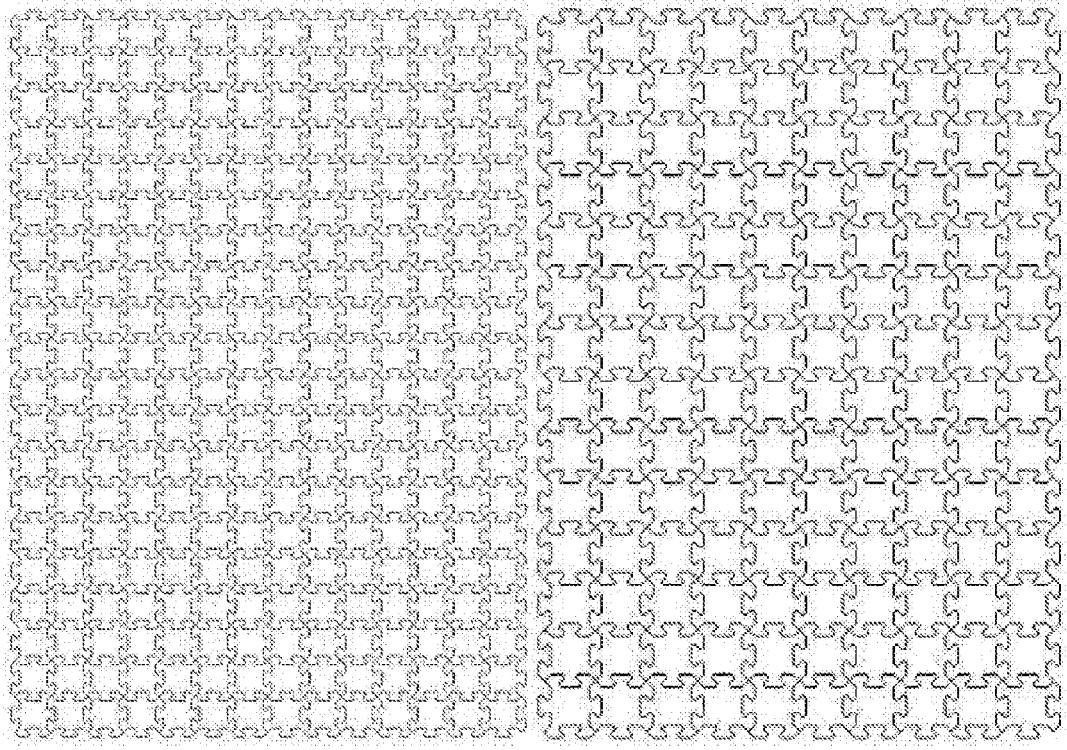

FIG 30b
FIG 30a
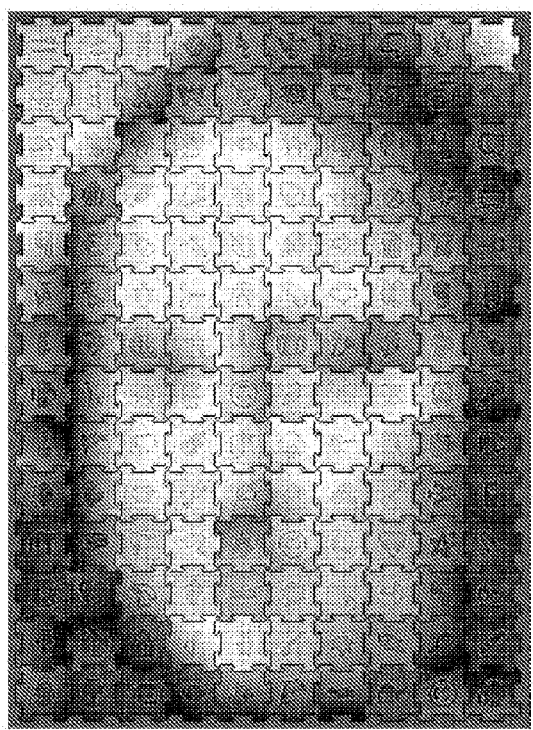
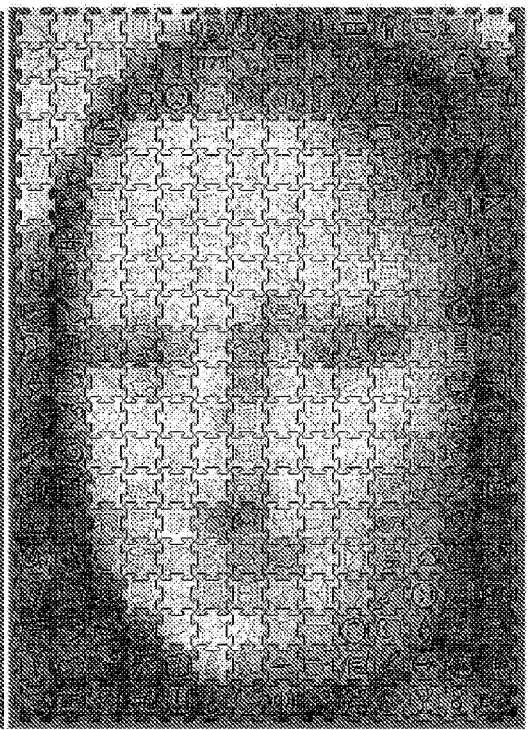

US 8,628,087 B2

PERSONALIZED MOSAIC PUZZLE SET

RELATED APPLICATIONS

This application is a continuation-in-part of PCT/US2010/020280 filed Jan. 6, 2010, (published as WO 2010/080841). This application claims the benefit and priority from U.S. provisional application 61/253,012 filed Oct. 19, 2009 and, Japanese patent application 2009-001127, filed Jan. 6, 2009.

FIELD OF THE INVENTION

The invention relates to mosaic puzzles and, particularly, but not solely, to a personalized mosaic jigsaw puzzle set (or aggregate) of a predetermined number of source tiles (pieces), all of which are assembled to form a recognizable semblance of any user selected target picture. The invention includes the set per se and a method, apparatus and system for assembling such puzzles and for billing a user.

BACKGROUND OF THE INVENTION

Commercial jigsaw puzzle sets are designed to reproduce only a single target picture of non-abstract subject matter. Although a user can pre-order a set with a user selected target picture, assembly is still restricted to only that single target picture, which limits the user's potential enjoyment and satisfaction. Such jigsaw puzzles are frequently only assembled once and then framed in their assembled state or discarded.

Notwithstanding, it has been proposed, for example in U.S. Pat. No. 6,137,498 to Silvers to arrange together many small photographs from an apparently unlimited store, as source images, to form a recognizable semblance of a large target image, by similarly comparing, automatically, brightness and color of disjoint sub-areas/sub-regions of each small tile image with corresponding sub-areas/sub-regions into which the larger target picture is partitioned. However, as almost one hundred photographs are required as source images, each of which is divided into more than two hundred sub-regions for a 1:1 comparison with corresponding sub-regions of the target image, a relatively long processing time is required to obtain a satisfactory match.

Such approach may, therefore, be inherently unsuited to a commercial situation where a large numbers of users are simultaneously uploading user selected target picture images on line, for example, even pictures taken on their cell phones, and are impatiently, waiting for a mosaic copy, even while still on line.

In addition, only the one picture can be made with the limited number of images that have been selected and matched to that picture. The set of images selected for that one picture cannot be re-used to make a recognizable semblance of another picture. It would be necessary to select/substitute other source pictures from the apparently unlimited store.

Furthermore, the prior patent is not suggestive of any user intervention to assemble the source images even when matched to the target picture, the source images being merely presented as unlimited stored digital images, not as a predetermined limited number of mechanical tiles/pieces, as required with a mosaic or jigsaw puzzle set sold to a user and, does not provide any instructions or adaptation for any such user assembly.

SUMMARY OF THE INVENTION

According to aspects of the invention, at least some of the above-mentioned disadvantages are obviated or ameliorated by a contrasting approach which includes, for example, one or more of: computing only a limited number of appearance characteristics, (three for grey-scale and five for color images), for each comparison of a source tile image with a target region image; providing identification codes for each puzzle piece and outputting correlated assembly instructions, such as a piece arrangement chart; comparing sums of mismatches of pairs of source tiles/pieces with pairs of target regions and exchanging the positions of the source tiles for each other if such sum of mismatch values would be reduced by the exchange and progressively storing the mismatch values to avoid a need for measurements of any tile in an identical position at a later stage of computing.

According to one aspect, the invention provides a personalized set of mosaic puzzle source tiles for assembly in their entirety into a recognizable semblance of almost any user selected target picture such as a person's face by following directions based on an automated analysis of the selected face in terms of appearance characteristics of the source tiles and supplied to the user on, for example, a source tile arrangement chart, comprising:

a predetermined, limited number of puzzle source tiles of identical size and shape having front, image forming faces bounded by respective edge portions and which are rotationally symmetrical, enabling assembly together in at least two different rotational positions with image forming faces in edge-to-edge abutment;

the image forming faces having respectively different patterning which varies progressively and smoothly across image faces reaching extremes at predetermined designated edges of individual source tiles providing respectively different brightness characteristics distributed over a brightness range; and wherein at least one of a respective front face and a respective rear face of all respective source tiles is marked with indicia providing respectively different tile identification codes providing directional characteristics enabling the source tiles to be assembled together in correct rotational positions to form a recognizable semblance of the target picture by following the directions provided by correctly positioned indicia on the source tile arrangement chart.

Preferably, the indicia are marked on the front, image forming faces and have surfaces having one of a different reflection rate, gloss and roughness from the patterning on the image forming faces of the pieces so that the identification codes can be seen when viewed from one of an oblique angle and in a direct light, so that the puzzle mosaic can be advantageously assembled from the front while the assembler is viewing the image being formed during tile assembly, but so that the indicia from the identification codes become so indistinct as not to significantly detract from the recognizable likeness of the assembled mosaic image to the target image when the assembled mosaic image is viewed from one of the front and in indirect light, respectively. As a practical matter, the indicia may have a surface of clear varnish and the set includes a container of a similar varnish.

For color images, the patterning may be in three primary colors, for example: red, green and blue.

The set may comprise a set of instructions with at least one of a remote/web site address and access code for uploading the user selected image to the site and downloading the assembly directions.

In addition, the set may comprise a piece-supporting and aligning placement tray, marked with a tile placement grid with orthogonal axis coordinates supporting individual source tiles, during their assembly of the target picture in accordance with the arrangement chart.

In practice, the set purchaser can capture a target image such as a friend's face using a cell phone camera and the target image data uploaded to a web site or PC having a database storing respective image characteristics of respective pieces and software which partitions the image into the same number of regional image data (300, 315 etc) as the predetermined number of pieces, performs the requisite image matching process to match the source pieces having image faces with the most similar (least different) design/indicia/shading to the respective regional image data and outputs an arrangement chart which can be displayed on the web site, same cell phone screen or printed out on a (user's) PC. The source tiles may be assembled on the arrangement chart (possibly supported by the tray), or on the tray while following the chart displayed on the screen).

It is usually preferred, that the source tiles of the set are in a humped population distribution with more puzzle source tiles in middle divisions of average brightness than at extremes of average brightness and average darkness. As explained below, this can enable fine details of the target picture to be more visible.

Preferably, the brightness characteristics of the source image forming faces comprise respectively different, predetermined, combinations of three brightness appearance characteristics comprising average brightness, direction of a brightness gradient and magnitude of a brightness gradient. Thus, only three comparison values of appearance need be matched for grey-scale. Specifically, directions of brightness gradients of all source tiles are all in a same rotational sector, for more efficient processing. Furthermore, each brightness gradient is formed by a brightness plane of constant inclination sloping in two transverse directions, with the directions of the brightness gradients of all source tiles spanning (being distributed across) the entire rotational sector.

Respective edges of source tiles may form one of all triangles, all elongate rectangles, all squares and all hexagons and form interlocking protrusions and recesses for interlocking with complementary recesses and protrusions of abutting source tiles.

The puzzle source tiles are divisional areas of a single predetermined picture.

According to another aspect, the invention provides a personalized set of mosaic puzzle source tiles for assembly in their entirety into a recognizable semblance of almost any user selected target picture such as a person's face by following directions based on an automated analysis of the selected face in terms of appearance characteristics of the source tiles and supplied to the user on, for example, a source tile arrangement chart, comprising:

a predetermined, limited number of source tiles of identical size and shape having front, image forming faces bounded by respective edge portions and which are rotationally symmetrical, enabling assembly together in at least two different rotational positions with image forming faces in edge-to-edge abutment;

the image forming faces of all the puzzle tiles being divisional areas of a single, predetermined recognizable source picture and having patterning providing, respectively, sufficiently different brightness characteristics enabling all the tiles to be assembled to form a recognizable semblance of any user selected target picture such as a person's face.

The puzzle tiles may be virtual, being images displayed on a screen for assembly according to a virtual arrangement chart.

According to a further aspect, the invention provides a system for providing, automatically, user instructions for assembling a mosaic tile copy which is a recognizable semblance of almost any target picture selected personally by a user comprising:

a personalized mosaic tile puzzle set according to any one of the preceding claims;

a data store retaining mathematical values of size, shape and brightness appearance characteristics of all source tiles of the set;

means for receiving any user selected target picture;

means for automatically dividing the received target picture into a set of a same number of target picture areas of identical value of size and shape to source tiles; measuring/calculating corresponding mathematical values of brightness appearance characteristics for all target picture areas; comparing the measured/calculated values for respective picture areas with the stored values for respective source tiles; and means for assigning respective source tiles images to locations of respective target picture areas on the basis of respective least different values of brightness appearance characteristics between an assigned tile image and a target picture area at the location;

means for outputting/displaying the assigned locations of the tile assignments as a tile arrangement chart with the assigned source tiles being identified by one of their identification codes and their images showing the assembled mosaic copy.

According to an additional aspect, the invention provides a system for one of assembling, automatically, a recognizable mosaic copy of almost any target picture selected personally by a user and providing, automatically, user instructions for assembling such mosaic copy, comprising:

optionally, one of a data store retaining mathematical values representing a set of a predetermined number of source image tiles, comprising values of size, shape and respectively different combinations of brightness appearance characteristics of all source tiles of the set, and means for receiving a source image and dividing the source image into a set of a predetermined number of source image tiles of equal size and shape, measuring mathematical values of respectively different combinations of brightness appearance characteristics;

means for receiving any user selected target picture and for dividing the target picture into a set of a same number of target picture areas of equal size and shape to all source image tiles;

means for assigning respective source tiles images to locations of respective target picture areas on the basis of respective least different values of brightness appearance characteristics between an assigned tile image and a target picture area at the location;

means for outputting/displaying the assigned locations of the source tiles images assignments as a source tile arrangement chart with the assigned source tiles being identified by one of respective identification codes and their images showing the assembled mosaic copy.

Preferably, the assigning means initially assigns arbitrarily source tiles images to target picture areas and iteratively, for all target picture areas, provisionally assigns source tiles images to respective different target picture areas and calculates, mathematically, respective mismatch values between respective combinations of values of respective individual source tiles images and values of respective individual target picture areas to which those source tiles images are provisionally assigned and calculates prospective corresponding mismatch values if the provisionally assigned source tiles images are exchanged for each other;

exchanging the source tiles images for each other when the sum of said mismatch values would be reduced by the exchange; and when exchanges would no longer reduce the sum of said mismatch values, providing one of a display of all the source tile images in their respective assigned positions forming the recognizable mosaic copy of the user selected target image and user instructions for assembling the mosaic copy of the user selected target picture.

Preferably, the source image tiles are rotationally symmetrical and such that each source image tile can be positioned in a plurality of alternative rotational positions, respectively, with all tiles images in edge-to-edge abutment The source image can be a recognized iconic picture.

It is further preferred that the source image and the target picture are in color, and that the assigning means determines average brightness as the average of each of individually measured mathematical values of a first, second and third individual primary color, respectively, and determines the magnitude and direction values of the brightness gradient based on the three individual brightness values of each primary color, thereby providing five mathematical values of comparison.

For change across a tile, brightness of primaries collectively is sufficient, as human perception is very significantly more sensitive to brightness changes than to spectral changes.

Thus, the impractically massive computation and user unfriendly processing time which would otherwise be needed for processing the many recognizable colors is obviated. Utilizing only a single brightness gradient based on the brightness of the three primary colors instead of three gradients, one for each color, reduces the computation very significantly by more than 50% of the computation which would otherwise be required if based on three gradients.

The importance of this saving in processing time can be vitally significant when puzzle users snap and upload their selected target picture using a cell phone and expect to obtain the assembly direction resulting from the processed image almost immediately, (even while still on line).

Furthermore, for practical reasons, five values are much more easily managed than nine values when construction the very many (possibly multiples) more tiles that will typically be required for color.

Thus, characterization of areas is minimal, and equally applicable to tiles as specially-formed swatches, or pieces of other cut-up pictures, or small pictorial, schematic, or artistic images.

As mentioned, suitable characterization of tiles and areas, for grayscale case are average brightness plus additional values defining a best-fitting mathematical plane of brightness through the tile or area; for color, the five values are three values for the averages of the three color components throughout the region, plus two defining the best-fitting mathematical plane of brightness throughout the region, where brightness may be taken to be the sum of the three components at any point (pixel).

The 3 or 5 parameters are readily adjustable by coefficients, one for each of the area/region-characterizing values, which coefficients may be established for the entire process, for example, mismatch in overall brightness may be exaggerated or diminished in importance relative to local variation in brightness; for another example, mismatch may be exaggerated in the central area of a picture, resulting in the mechanism's tendency to better satisfy the central area with a substitute tile.

A picture to be re-rendered as a mosaic may be first altered by histogram-adjustment of brightness for gray scale, or component values for color, to match the statistics of the source tiles of representation, and furthermore its local contrast may be adjusted to match the statistics of brightness change within source tiles.

The user may purchase an additional identical puzzle set or three additional identical puzzle sets, thereby providing a double number of available tiles or a quadruple number of available tiles so that the tiles of all sets can be assembled together to form a correspondingly larger mosaic semblance of a same target picture than the tiles of a single set. For one additional set, the tiles of each set number 315 and can combined for assembly in a 21×30 mosaic tile array which has a same aspect ratio as a mosaic of 15×21 being assembled from tiles of a single set; for three additional sets, one can make a picture 30×42. Four sets of 300 each (1200) are needed for the same aspect ratio as a single 300 piece set (15×20). According to another aspect, the invention provides a method for one of assembling, automatically, a recognizable mosaic copy of any target picture selected personally by a user and providing, automatically, user instructions, for assembling such mosaic copy, comprising the steps of:

one of providing a predetermined set of a number of source image tiles having predetermined respectively different combinations of three mathematical values of appearance characteristics, comprising average brightness, direction of a brightness gradient and magnitude of a brightness gradient and dividing the source image into a set of a number of source image tiles and measuring respective tiles images' respective combinations of three mathematical values of appearance characteristics, comprising average brightness, direction of a brightness gradient and magnitude of a brightness gradient;

dividing/partitioning the target picture into a set of a same number of target picture areas, all source image tiles being of equal size and shape both to each other and to all target picture areas, and being rotationally symmetrical such that each source image tile can be positioned in a plurality of alternative rotational positions, respectively, with all tiles images in edge-to-edge abutment; and, assigning respective source tiles images to locations of respective target picture areas by initially assigning arbitrarily source tiles images to target picture areas and iteratively, for all target picture areas, provisionally assigning source tiles images to respective different target picture areas and calculating, mathematically, the respective mismatch values between respective combinations of values of respective individual source tiles images and values of respective individual target picture areas to which those source tiles images are provisionally assigned and calculating prospective corresponding mismatch values of pairs of tiles when the provisionally assigned source tiles images were exchanged for each other;

exchanging the source tiles images for each other when the sum of said mismatch values would be reduced by the exchange; and when exchanges would no longer reduce the sum of said mismatch values, providing one of a display of all the source tile images in their respective assigned locations forming the recognizable mosaic copy of the user select target image and user instructions for assembling the mosaic copy of the user selected target picture.

Preferably, prior to assigning respective source tiles to respective target picture areas, the method includes the further step of mathematically adjusting values of the respective directions of the brightness gradients of respective source tiles images and the respective brightness gradients of respective target image areas so that the directions of the brightness gradients of the source tiles images and the brightness gradients of the target image areas are effectively rotated to all lie in a same rotational sector and, when tile assigning is completed, reversing the mathematical adjustments of the respective directions of the brightness gradients of the source tiles images and of the target picture areas by adding mathematical values required for the reversal to the respective corresponding values of the directions of brightness gradient of the respectively assigned source tile images and of the target picture areas, thereby effectively rotating the source tiles images and the picture image areas back to the original rotational positions of the respective picture image areas in the assigned locations.

This pre-rotation avoids a need for comparison of the source tiles with the target regions in all rotational positions throughout entire comparison procedure for all tiles, saving considerable processing time. Preferably, the method includes the further step of progressively storing calculated values of all initial mismatches and updating stored values only when exchanges are performed. thereby obviating need to recalculate a previously calculated mismatch and further reducing the processing.

According to another aspect, the invention provides a mosaic puzzle piece/tile arrangement calculation system comprising a piece aggregate or set wherein multiple pieces on which multiple types of designs and characters have been pre-printed are arranged to collectively form a desired finished image and an arrangement calculation unit for outputting the piece aggregate arrangement results, wherein designs and characters, each type of which is at least either a different hue, saturation, or brightness, are printed and different identification codes for each type of piece or for each piece are marked on the image surface of each piece such that the user can arrange each piece in accordance with an identification code arrangement table output by the arrangement calculation unit, or can arrange each piece on the basis of a finished output by the arrangement calculation unit and confirm correct interpretation by the identification code arrangement table, said piece arrangement calculation system characterized in that the arrangement calculation unit comprises:

a piece image database for storing images of designs and characters printed on each piece as piece image data;

original image data input means for inputting original image data that become the basis of the finished image;

original image data partition means for partitioning the original image data into regional image data of regions that correspond to each piece when the pieces are arranged;

image comparison means for comparing the regional image data and piece image data of each piece using specific comparative values;

piece arrangement determination means for inputting the comparative values relating to all of the pieces and determining the optimal arrangement of each piece by a specific operation formula; and arrangement results output means for outputting the arrangement results by at least outputting the determined arrangement as arrangement table data using the identification codes or outputting the finished image that is in accordance with the determined arrangement.

Preferably, by means of the image comparison means, one or more measured points on each regional image of the regional image data and a measured point at the same position on the image surface of each piece are compared and the difference in the value relating to at least either hue, saturation, or brightness at each point is calculated as the comparative value.

It is also preferred that, by means of the image comparison means, the direction of change in either the hue, saturation, or brightness of the image is as uniform as possible under the restriction that the regional image and the image surface of each piece is rotated in succession by increments of angles of rotation by which they can be arranged, the comparative value is calculated in this state, and when the arrangement results output means output the arrangement table, the information on the angle of rotation when the pieces are rotated is printed and output in the arrangement table as the pieces are arranged.

It is further preferred that, by means of the piece arrangement calculation system, the original image data input means of the arrangement calculation unit receives the original image data transmitted from the user terminal through the network circuit, and the arrangement results output means transmit at least either the arrangement table data or the finished image to the user terminal via the network circuit.

The invention also provides an arrangement calculation unit for outputting arrangement results of a mosaic tile/piece aggregate, wherein multiple pieces on which multiple types of designs and characters have been pre-printed are arranged to collectively form a desired finished image which is a recognizable semblance of a target picture, said arrangement calculation unit characterized in comprising:

a piece image database for storing images of designs and characters printed on each piece as piece image data; original image data input means for inputting original image data that become the basis of the finished image; original image data partition means for partitioning the original image data into regional image data of regions that correspond to each piece when the pieces are arranged; image comparison means for comparing the regional image data and piece image data of each piece using specific comparative values; piece arrangement determination means for inputting the comparative values relating to all of the pieces and determining the optimal arrangement of each piece by a specific operation formula; and arrangement results output means for outputting the arrangement results by at least outputting the determined arrangement as arrangement table data using the identification codes or outputting the finished image that is in accordance with the determined arrangement.

In addition, the invention provides a mosaic tile/piece arrangement calculation billing system comprising a piece aggregate wherein multiple pieces on which multiple types of designs and characters have been pre-printed are arranged to collectively form a desired finished image which is a recognizable semblance of a target picture and an arrangement calculation billing unit for calculating the fee for an order for an arrangement table placed by the user and outputting the piece aggregate arrangement results, wherein designs and characters, each type of which is at least either a different hue, saturation, or brightness, are printed and different identification codes for each type of piece or for each piece are marked on the image surface of each piece such that the user can arrange each piece in accordance with an identification code arrangement table output by the arrangement calculation unit, or can arrange each piece on the basis of a finished image output by the arrangement calculation unit and confirm correct interpretation by the identification code arrangement table, said piece arrangement calculation billing system characterized in that the arrangement calculation billing unit comprises:

a piece image database for storing images of designs and characters printed on each piece as piece image data;

original image data input means for receiving the original image data that become the basis of the finished image transmitted from the user terminal through a network circuit;

original image data partition means for partitioning the original image data into regional image data of regions that correspond to each piece when the pieces are arranged;

image comparison means for comparing the regional image data and piece image data of each piece using specific comparative values;

piece arrangement determination means for inputting the comparative values relating to all of the pieces and determining the optimal arrangement of each piece by a specific operation formula; and arrangement results output means for transmitting the arrangement results by at least either transmitting, to the user terminal via the network circuit, the determined arrangement as arrangement table data using the identification codes, or by transmitting the finished image that is in accordance with the determined arrangement, and billing recording means for recording the user information of the user terminal and the billing information of the arrangement results in the billing database.

Thus, as indicated above the current method exhibits a novel measure of match of a piece with a picture area, design of a fixed set of pieces suitable for representing a great variety of alternative pictures, and means of providing an overall plan stating which piece to place where, in which orientation. All three of these methods are precisely specified, and implemented by computer programming.

A fixed set of pieces is designed, accordingly, to span rather uniformly various degrees of brightness, and rates of change horizontally and vertically. For example, when the number of, interlocking pieces for a jigsaw puzzle be 315 (15 columns of 21 rows), the set is designed to cover 15 brightness levels and, for each, 3 basic directions and, for each of those, 7 rates of brightness change (with basically square pieces, shaped for re-orientation in 90 degree increments, this allows for 12 directions of increasing brightness).

Providing an optimum plan—which pieces to place where, in which orientation—is computed in a novel way, enhance by efficient computing. Pieces are at first assigned to places arbitrarily; then hundreds of add an element of surprise thousands of pairwise measures of appropriateness are made, asking whether or not to exchange the locations of the pair. After as little time as one second or less, the assignments settle down such that an exchange of no pair of pieces would decrease the totality of mismatches.

As the mosaic image assembled from the source images does not provide an exact reproduction of the target image, the user cannot predict or anticipate the completed image, which adds an element of surprise and enjoyment for the user and provides an incentive to disassemble and reassemble the pieces into many different target images, increasing the commercial success. The assembled mosaic image also has a style which enhances the artistic appeal.

Significant advantages of the method of the present invention are that all measures of tile match (brightness average, brightness gradient direction, magnitude) are kept in play; a large tile-area difference in any one of them can influence, even dominate, at any stage of the process. Furthermore, large mismatches (in one or all measures) create early improvements; no early decisions prevent or delay readjustments.

There is no presumption of the distribution of characteristics, and no lists are made or used with regard to areas or tiles. Values of average mismatches can be made, stored and updated, during the process, and these stored values can be used throughout during further processing to adjust the matching of a particular target picture region to source tile set by adjusting coefficients in the basic mismatch function (or it may be asserted that, for a particular set of pictures that averages are more important than local slopes, or vice versa).

According to another embodiment, the tiles also have rear, image forming faces bounded by the respective edge portions and having respectively different patterning both from each other and from the front faces which patterning varies progressively and smoothly across the rear image faces, reaching extremes at predetermined designated edges of individual source tiles, providing respectively different brightness characteristics distributed over the brightness range; both a respective front and rear of all respective source tiles are marked with indicia providing respectively different tile face identification codes providing directional characteristics; said tiles being self-similar in said at least two rotation positions when turned over to expose an opposite face enabling the source tiles to be assembled together in correct rotational and facing positions with any tile exposing a front or a rear face to form the recognizable semblance of the target picture by following the directions provided by correctly positioned indicia on the source tile arrangement chart.

As there are twice as many available image faces to display as there are individual tiles/pieces, in any assembled puzzle of a given size, with proper pairing of front and back patternings, large dark or large light areas can be better depicted, up to an entire picture being dark, or light. Conversely, when a larger number of tiles might be difficult to manage, for example, by a young child, the number of tiles can be reduced by one half without the same degree of loss of reproduction as with a set of tiles each of which have only a single image face.

Preferable, for all tiles, the average brightness characteristics of the respective front and rear faces of each tile differ by a same percentage/proportion of the total brightness range of the set.

This maximizes the potential range or scope of accuracy of brightness reproduction.

The difference in the average brightness characteristics may be one half of the brightness range.

This provides user program selectable groups of different tile brightness ranges available at one time to more accurately reproduce target pictures or, individual tile sets attachable together to form divisional areas of larger composite semblances of the target picture, which are for example, of overall/average relative brightness, of overall medium brightness and overall low brightness (dark). Such selection and matching also renders less visible or effectively masks, join lines which link the adjacent tile sets forming the composite picture together in the assembled composite picture apparently rendering the composite picture seam-free.

The predetermined edges at which the patterning reaches extremes are common to the front and rear faces of each tile.

The tile edge portions form interlocking protrusions and recesses for interlocking with complementary recesses and protrusions of abutting source tiles with one set of opposite edge portions of respective tiles being identical in shape and another set of opposite edge portions, orthogonal to the one set, also being identical and of complementary shape to the opposite edge portions of the one set, enabling the tiles to be linked to adjacent tiles when flipped/turned over about either of two orthogonal axes.

Each symbol may be defined by an outline, darker than the average brightness of the background face and bordered on an inside for a majority of its length by a band darker than the average darkness of the face and bordered on an outside for a majority of its length by a band brighter than the average brightness of the face so that the symbol becomes less visible in the context of the semblance of the target picture as the distance of a spectator from the picture increases, in accordance with the 'Cornsweet illusion'.

The identifying indicia on respective opposite faces of each piece are identical and differently oriented according to the shape of the piece enabling the piece to be easily found obviating a need to turn pieces over to reveal the symbol, if they were different.

The assigning means and method may compare only average brightness of each piece and the picture areas in an initial part of the mismatch search, and only when the number of mismatches so found falls to a predetermined level, compare also the brightness gradient directions and magnitude.

This approach results in a significant reduction of computations saving computer power and time

BRIEF DESCRIPTION OF THE DRAWINGS

Embodiments of the invention will now be describe by way of example only and with reference to the accompanying drawings in which:

FIGS. 3 (a)-(d) are schematic plan views of respective image faces of different pieces of the jigsaw puzzle set according to present invention.

FIGS. 5 (a)-(d) are schematic plan views of an image face of a single puzzle piece in successive rotational positions;

FIGS. 6 (a) and (b) are schematic plan views of target (original) image region or area and a puzzle piece (source tile) image, respectively, showing their relationship;

FIGS. 7 (a), (b) and (c) are similar view of image faces of respective pieces with respectively different directions of brightness gradient;

FIGS. 10 (a) and (b) are plan views of four original (target) region image tiles in different rotational arrangements;

FIGS. 11 (a) and (b) are plan views showing image faces of overlying source tiles and target region tiles in different relative rotational positions;

FIGS. 28a and 28b are schematic plan views of two-faced pieces of different size linked together as 280 and 140 piece sets of identical size, respectively;

FIGS. 30a and 30b show, respectively, 140 and 280 two-sided piece sets providing assembled images of the same size, for comparison of the resolutions;

PARTICULAR DESCRIPTION

Figure 1:
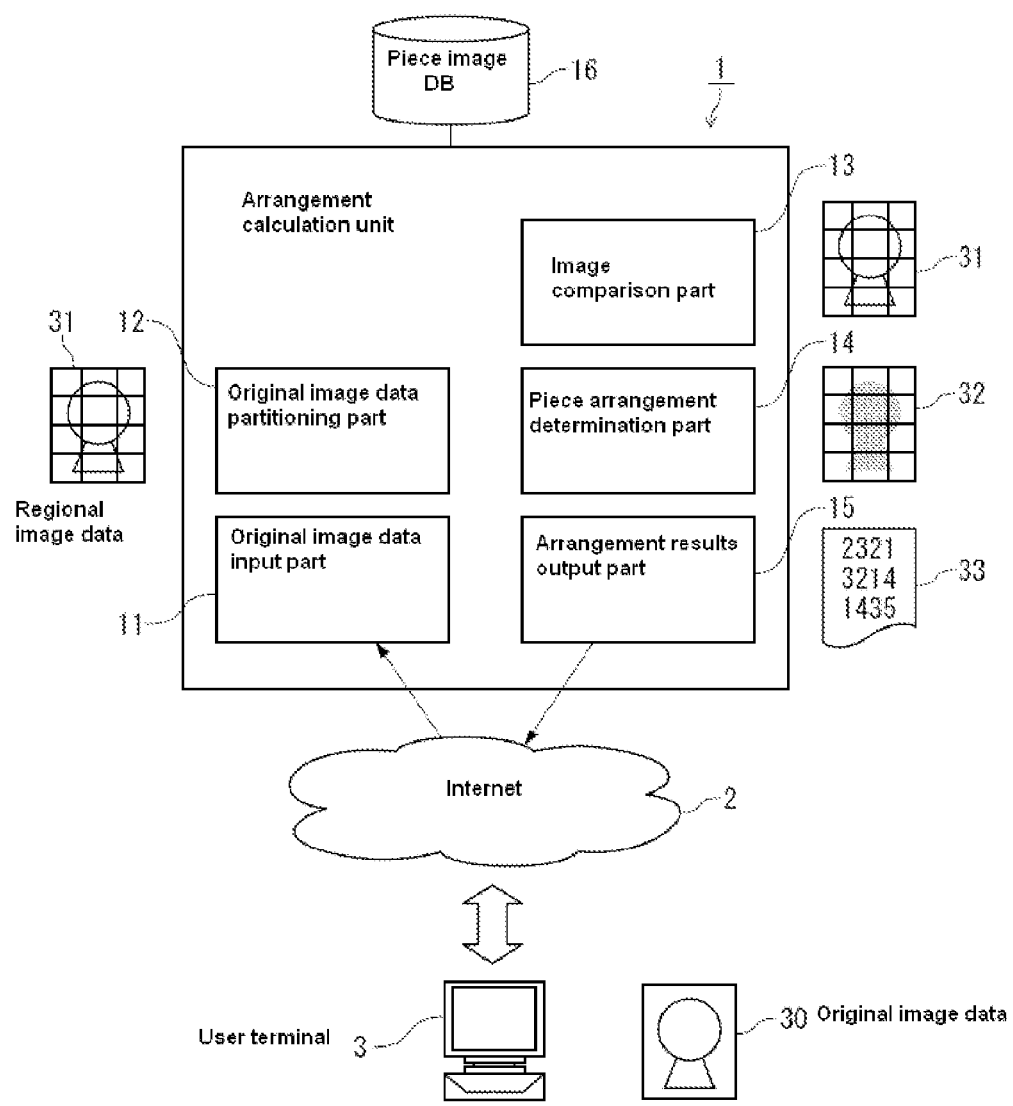
FIG. 1 is a schematic view of the general system of the present invention.

FIG. 1 shows an example of the construction of a system comprising an arrangement calculation unit (1) of the present invention, Internet (2), and a user terminal (3). The source tile set of the present invention will be described below in terms of a piece aggregate using a jigsaw puzzle set as an example.

First, at user terminal (3) the user introduces any desired original (target) image data (30), which is variable image input information, and transmits it to arrangement calculation unit (1) via Internet (2). For instance, a piece of paper carrying the address/password of arrangement calculation unit (1), which is the server to be accessed, is sealed in the sold jigsaw puzzle package, and the user who has purchased the puzzle accesses the address using his web browser.

A message asking permission to transmit an image to user terminal (3) is displayed at arrangement calculation unit (1), original image data (30) are specified at user terminal (3), and transmission to arrangement calculation unit (1) is initiated by pushing the "upload" button displayed on the screen.

Original image data (30) are received by an original image data input part (11) disposed at the CPU of arrangement calculation unit (1) and stored in an external memory, which is not illustrated.

Figure 2:
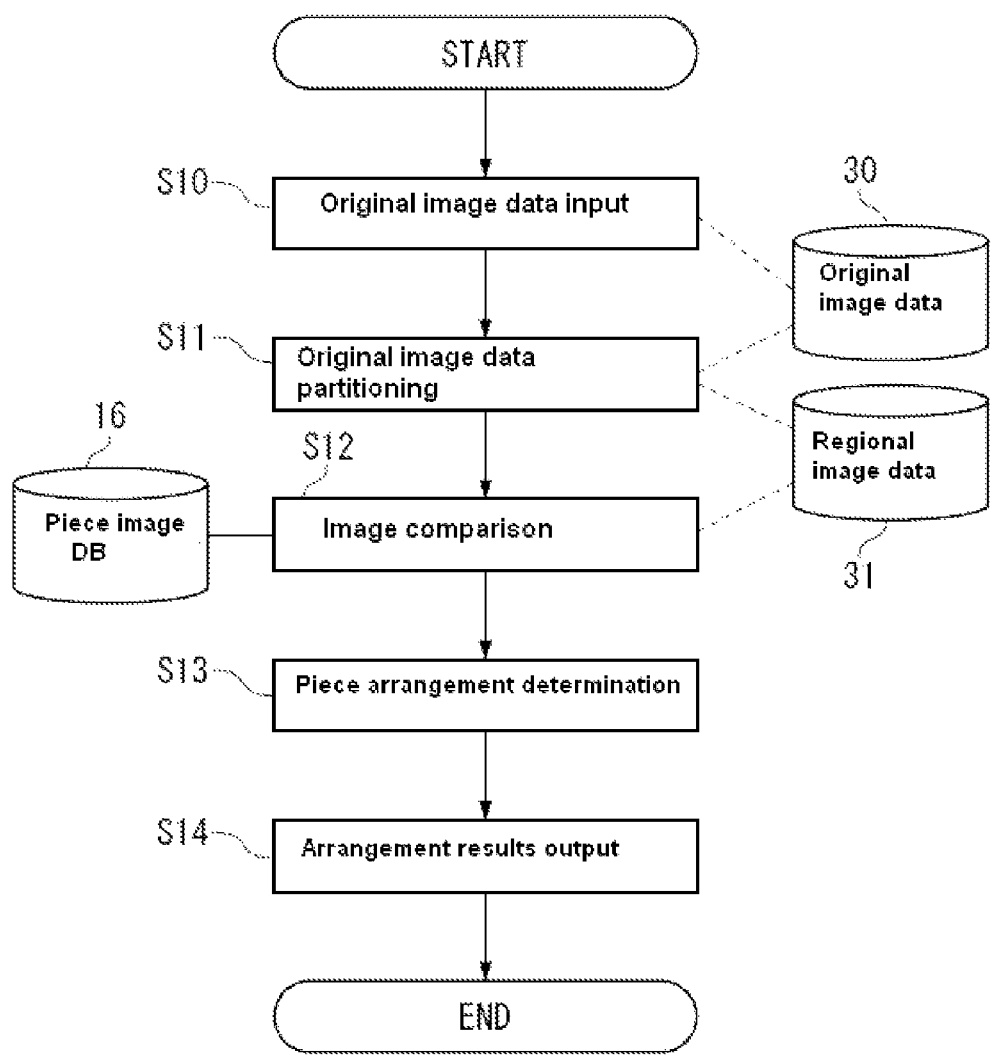
FIG. 2 is a flow chart of processing steps of the present invention.

As shown in FIG. 2, the initial processing is original image data input step (S10). Although, as one example, original data are received from user terminal (3), alternatively, original image data (30) can be read from an external memory of unit (1) or, obtained from a connected image scanner or digital camera.

Before proceeding to the next original image data partitioning/dividing step (S11), processing is performed whereby the image is corrected in order to simplify the further processing of original image data (30).

First, in this example, color information is removed from original (target) image data (3) and the image is converted to a grayscale image to output a monochrome image as the finished image. This conversion processing is performed by an image correction processing part, (not illustrated), of the CPU of this unit (1). The technology for grayscale conversion is conventional and therefore will not be described. A grayscale with 256 shades of gray is used, ranging from 255 as the lightest/brightest (white) part and 0 as the darkest (black) part.

Figure 8:
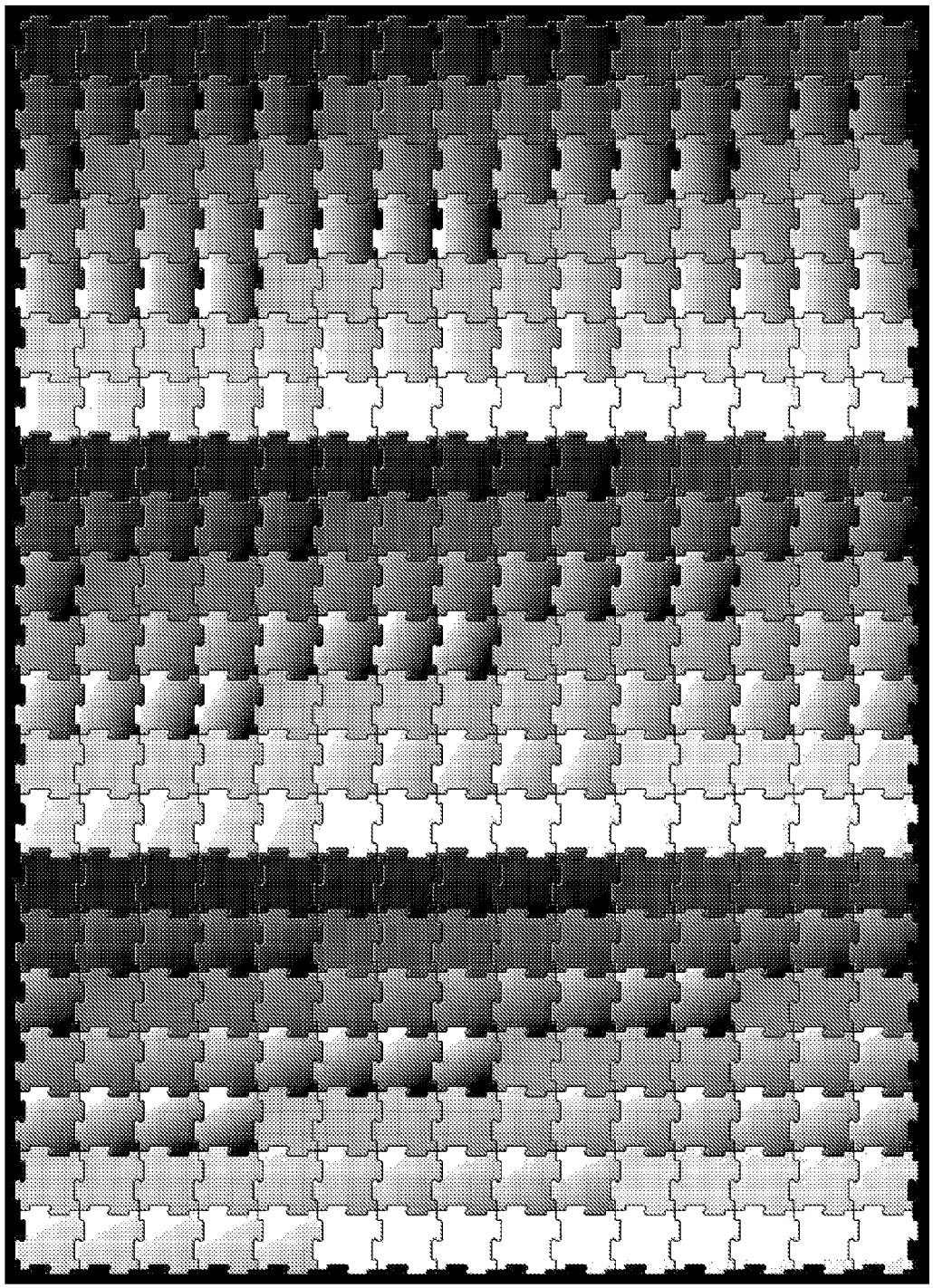
FIG. 8 is a plan view of the image faces of a piece aggregate or set of pieces linked together to form a sheet.

Each original (target) image area and each source tile image is characterized by average brightness and by direction and magnitude of brightness gradient. For better sensitivity in matching pieces (source tiles) to original image areas, initial non-visually-disruptive adjustments are made to original (target) picture brightness in two ways: (1) globally (throughout the original picture) to give original image area a statistical distribution of average brightnesses that conforms generally with that of the puzzle pieces, and (2) locally in an attempt to make small-scale variation in brightness to conform generally with the local shading (patterning) differences exhibited within individual puzzle pieces or source tiles:

(1) The well known and conventional method of processing pictures, termed histogram-leveling, is applied to use distinguishable shades of gray, from black to white, uniformly, thus re-rendering the original picture with more equal areas of the different shades. As can be seen in FIG. 8, the 300 piece set or piece aggregate has been made with such approach in mind, the brightness range (0-255) having been divided evenly into 10 divisions of equal brightness with 30 pieces occupying each division (10 pieces in each of the 3 groups of different gradient directions)

(An alternative, often preferable, processing step resulting in histogram humping in which the source pieces or tiles and original target picture are not distribute evenly but exhibit a distribution skewed towards middle values is also described below.)

(2) After the histogram leveling, in order to make proper use of source pieces (tiles) with high brightness gradients, the contrast of image structure of appropriate size (areas equal to one-half the area of a piece should be increased by an image filtering operation throughout the picture which has the effect of exaggerating the difference between a pixel's brightness and the average brightness of those pixels a half-tile's distance away.

This (well known) filtering technique can highlight characteristically small parts, such as the pupils of the eyes, eyebrow hairs, teeth, of an original (target) image of a person's face, drawing attention to the characterizing features of a face for improved recognition.

Therefore, when regions of an aggregate of a specific number of pixels or fewer, for instance, regions of 30 pixels or less, are darker than the surrounding parts, these regions will be made darker still and correspondingly sized relatively lighter areas will be made still lighter.

Once the above-mentioned type of correction processing has been performed, a histogram is calculated and level adjustment of the grayscale of original image data (3) can be performed.

The assembled image can also be represented in color in the present invention, and in this case, level adjustment of hue, saturation, and brightness is performed with the three primary colors.

Contrast adjustment and color balance adjustment of color images are conventional types of processing, and they can be performed as needed by the image correction part.

Original (target) image data partitioning/dividing step (S11) will now be described. An original image data partitioning part (12) obtains the size of the piece image from piece image database (16) housed in an external memory. As the finished image is reproduced by assembling all pieces the original (target) image (30) is also partitioned into regions/areas matching the size of each piece.

When the size of each piece is specified, partition processing can also be performed without referring to piece image database (16).

It should be noted that when an incoming original target picture is slightly oversize, with 5 extra rows of pixels that might be cropped from the top and/or bottom and 5 extra columns of pixels that might likewise cropped from the left and/or right and, for example, when the desired compact picture region to use is 90 pixels wide by 120 pixels high, cut into 6×6 pixel areas (300 pieces), with each such area to be defined in the three characteristic quantities of the present invention, an automatic choice of which of the 36 possible croppings to use to provide maximum detail for recognizable semblance is the central area, particularly when the original target picture is close-up of a face. The most small/fine detail can be obtained by using tiles with large magnitudes of gradient. The process, therefore, is to try one-by-one the 36 possible croppings, define them in the 3-criteria, and choose the one whose central area has the largest average magnitude of gradient.

The "central part" is taken as half the width and height of the original target picture and is centered laterally, and slightly above center, vertically.)

In step (S11), original target image data (30) are partitioned into regional image data (30) for 300 pieces. The regional image data of each piece are housed inside an internal or external memory, for example, as 300 pieces of data that are represented as a matrix, such as a variable-number target [row] [col]*.

(Alternatively, the original target picture can be divided into 315 areas corresponding to a puzzle set/aggregate of 315 pieces, providing the advantage that 2 sets combined have substantially a same aspect ratio as a single set).

When the partitioning (S11) is complete, the system proceeds to an image comparison step (S12).

Figure 4:
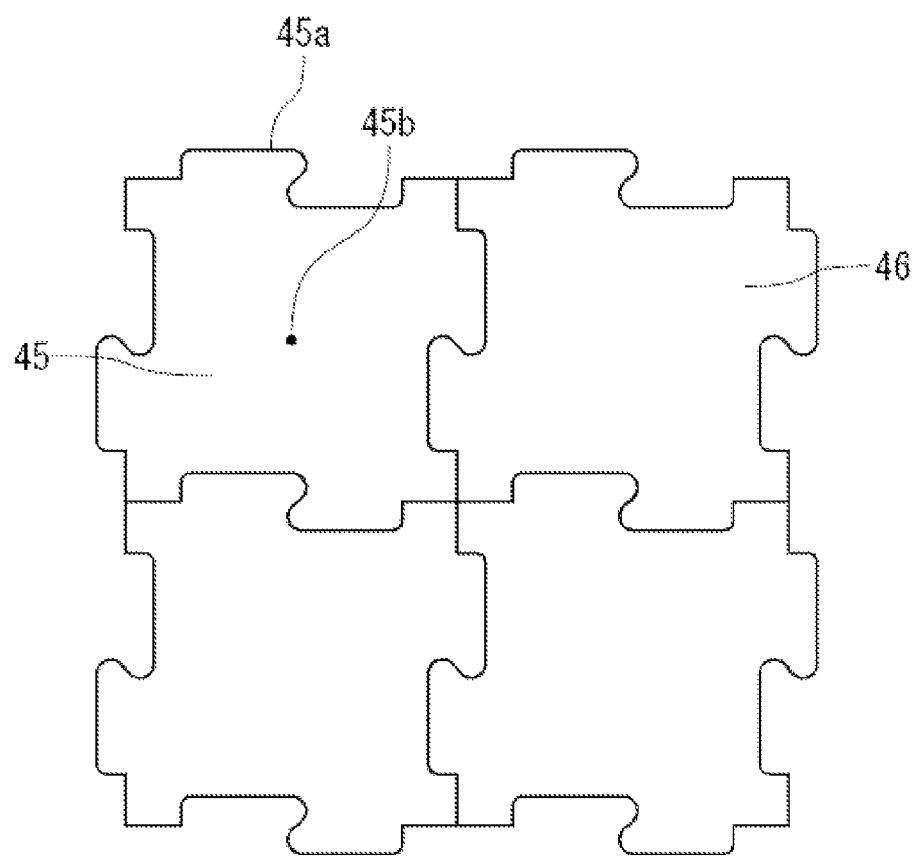
FIG. 4 is a schematic plan view of four interlocked puzzle pieces.

As shown in FIG. 3(a) to 3(d), as a result of their patterning, (which term encompasses any change in appearance, whether produced by repeated discrete marking (pixels), as shown, or continuous), all pieces exhibit a brightness gradient. However, the values are so small in pieces 41 in FIG. 3a and 42 in FIG. 3d that they might appear almost white and almost black, respectively. As shown in FIG. 4, outside edges (45a) of the pieces are formed with complementary indentations and protrusions with point symmetry with the center (45b) of all pieces (45) and which assemble in edge-to-edge relation with adjacent pieces to the left, right, top and bottom, in any of four rotational positions, providing rotational symmetry.

As specified in more detail below, the brightness of a computer-constructed puzzle piece or source tile is defined by three numerical values of brightness that together specify a mathematical plane: values at a central point and, (for square tiles, as shown), at points at predetermined increments inward from the center of the right edge and from the center of the bottom edge. The protrusions and the corners should not be darker than nor brighter than the maximum (and implied minimum) of those defining points. As a result of their rotational symmetry, as shown in FIG. 5, pieces (42) and (43) of varying brightness can have multiple appearances by being rotated 90 degrees at a time, from a first status position (a) where the piece becomes darker (gradient direction) toward 5:00 o'clock, to a second status (b) where the piece becomes darker at 8:00, to a third status (c) where the piece becomes darker at 11:00, and to a fourth status (d) where the piece becomes darker at 2:00, forming a maximum rotational sector of 90 degrees.

The significance of using such gradation is that changes in brightness in regional target/original image data (31) can be reproduced more faithfully. as possible. For example, FIG. 6(a) shows an enlargement of a regional image from the upper right of regional (target) image data (31) in FIG. 1. In this regional image (a), just a small portion of the head of a person is visible at the lower left in the region and this is reproduced using the positional status in FIG. 6(b) wherein piece (42) is rotated 90 degrees.

By using a design wherein pieces can be arranged by being rotated, it is possible to minimize the number and types of pieces required to sufficiently approximate the regional image data and produce a recognizable semblance of the original target image.

It should be noted that the shape of the pieces in the present invention is not limited to square, and there can also be cases in which the pieces cannot be arranged when they are rotated 90 degrees. In such cases, restrictions should be applied such that the pieces can only be rotated by the angle at which they can be arranged. For instance, it is possible to turn an elongate rectangle through only 180 degrees, (upside down). Regular hexagonal pieces can be rotated through a sector of 60 degrees at a time. In this case, it is possible to improve the reproducibility of the original image even though there are few changes/degrees of gradation on a piece.

In this example, there are three gradation/gradient directions for obtaining a finished image that is similar to the original image. This is illustrated in FIG. 7. The pieces gradually become darker moving toward 5:00 in FIG. 7(a), toward 4:00 in (b), and toward 3:00 in (c).

In essence, the direction of the brightness gradient in each piece changes 30 degrees at a time, and gradation in 30-degree increments all directions can be represented by using a combination of these three types of gradation directions and the above-mentioned rotation by 90 degrees.

Furthermore, as shown in FIG. 3, the magnitudes of the gradient angles also differ. In piece (42) the left half is light and the right half is somewhat darker whereas, in piece (43) where the left half is somewhat dark and the right half is darker still. Specifically, the degree by which the piece becomes darker increases at 3:00, 4:00, and 5:00 so that there are 7 10 steps. The piece with the highest degree of darkness displays the highest contrast within the piece.

In addition, the average brightness of a piece changes in 10 steps.

FIG. 8 shows the entire puzzle set with pieces releasably connected together as a sheet with all pieces lined up in rows.

One characteristic of the present invention is that providing a puzzle set as a monochrome design plays a role in making the puzzle visually interesting and more amusing.

Furthermore, when the puzzle set provides the user with all pieces preassembled to form one, predetermined finished image, or the user assembles a desired target image, the user will enjoy taking that image apart and repeating the operation to obtain a different image.

The patterning on the image surface of a source piece is not limited to the above-mentioned shading/gradation. Designs and characters/iconic symbols can also be used to provide the desired brightness changes and a theme. The designs can be an abstract design such as a geometric design, or an illustration, drawing, or photograph. The characters can be all language characters, or they can be character-like designs.

Moreover, when a color image is used, it can be classified not only by changes in brightness, as described above, but also by changes in hue and changes in saturation. An image can also be classified using a combination of these three elements. However, color changes without brightness changes are not usually effective in rendering a recognizable image such as a semblance of a target face. As a result, as described below, and in the interest also of efficient computation only five characteristic values or parameters are computed for color images.

Figure 9:
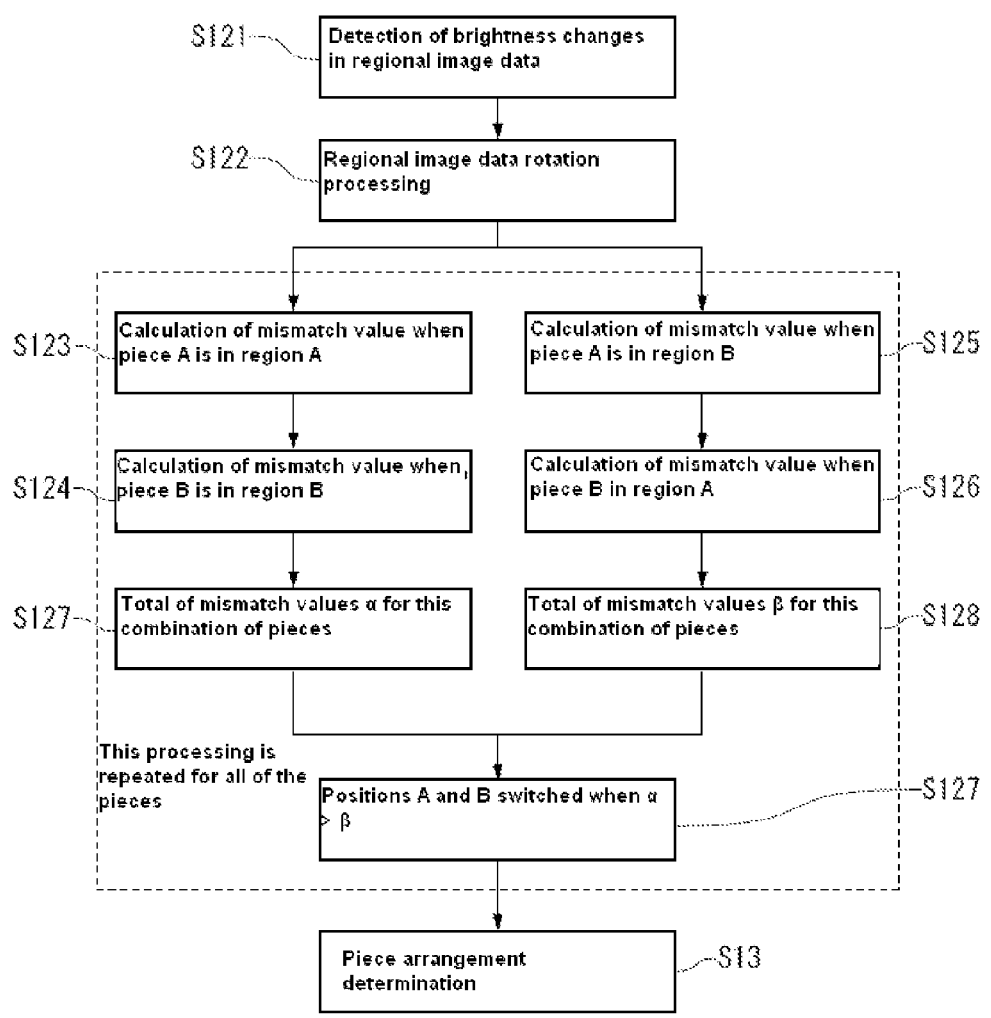
FIG. 9 is a flow chart showing processing steps for image comparison.

Returning again to the description of process (S12) by image comparison part (13). FIG. 9 is a detailed flow chart of this processing.

Image comparison part (13) reads piece image database (16) of the external memory and obtains the classification of the image surface of the piece as described above, particularly the direction of change in brightness. In essence, based on the above-mentioned example, this part obtains the type of direction of change in brightness as 3:00, 4:00, or 5:00. When this change is represented in the clockwise direction with 0:00 as 0 degrees, it becomes 90 degrees, 120 degrees, and 150 degrees. These changes can also be predefined as standard specifications of the system that are not read out from piece image database (16).

The image comparison part detects changes in brightness of all regional image data (31). This detection can be accomplished using a conventional image processing method, but in the case of a rectangle, it is also possible to compare the average brightness of four blocks defined by intersecting axes passing through a center and detecting in what direction brightness changes (step for detecting change in brightness of regional image data: S121).

Target regional image data (31) are rotated such that this direction is closest to the above-mentioned range of 90 to 150 degrees. This rotation is in 90-degree increments and the angle of rotation is recorded for all regional image data (regional image data rotating step: (S122).

When the angle closest to 90 degrees is 75 to 105 degrees, the angle closest to 120 degrees is 105 to 135 degrees, and the angle closest to 150 degrees is 135 to 165 degrees, the direction of change for all of the regional image data is within a range of 75 to 165 degrees (in the direction of 2:30 to 5:30 on the clock).

Thus, each piece image has a brightness gradient direction within this range or sector.

FIG. 10 shows a model of this processing. The pre-processing target regional image data (310) represent the image in FIG. 10(a), partitioned into four tiles (311) through (314).

The regional image of first tile (311) has a part (311a) that is dark at the lower right; therefore, the direction of change is roughly 110 degrees and rotation is not necessary. Second tile (312) has a part (312a) that is dark at the lower left and the tile is rotated 270 degrees to move this part to the lower right. Similarly, a third tile (313) is rotated 90 degrees and a fourth tile (314) is rotated 180 degrees.

As a result of this rotating processing (S122), in FIG. 10(b) all regional images have become images that have changed—having brightness gradient directions toward the lower right.

The tiles are rotated so that the direction is as uniform as possible, as described above. The condition "as uniform as possible" was added because the angle by which a piece is rotated so that it can be arranged is determined by the shape of the piece In the present working example the angle is 90 degrees, but a variety of angles can be used depending on the embodiment. The extent to which the tiles are similarly rotated varies with the types of direction of change in the piece. Therefore, the tiles are rotated so that their respective brightness gradients or slopes all extend in a same rotational sector so that they are as similar as possible under the restrictions for the angle of rotation.

Comparison processing (matching) is performed when the brightness gradients in a source piece image and a target regional image all have directions in the same sector. Conventional image recognition technology can be used to reveal the combination that provides the best match between all of the piece images and regional images. As a computer is used, when the combination of positions of all of the piece images is changed, the value of image matching with the regional image is simply integrated and the position of the piece image with the maximum image matching value, (minimum mismatch), provides the arrangement which is the closest semblance of the user selected original target image.

However, when there are many pieces, the calculation volume expands; therefore, a preferred calculation method is used in this example, which involves overlapping the piece images with the regional image data in the appropriate order without picking out any of the piece images (Of course, this is done by computer; the pieces are not actually laid out).

In this case, as shown in FIG. 11, for instance, the target regional image data status is not taken into consideration; therefore, in (a), even though the image of regional image A (320) changes toward the right, an image that changes toward the bottom is overlapped with piece image A (321).

In (b), in contrast to the fact that the image changes toward the bottom in regional image B (322), piece image B (323) changes toward the right.

In other words, as it is likely that the target regions' values will need to be compared with the corresponding pieces' values in all 4 rotational positions at each comparison, a significant reduction in the number of comparison steps will usually be obtained by adding values corresponding to an initial re-orientation or pre-rotation so that the directions of the gradients of all target regions lie in the same sector as those of the puzzle pieces before comparing the other brightness characteristics, and a compensating correction subtracting the added values or rotation back, applied at the end.

This is always needed for target areas, and also for source pieces if they are not defined originally to be thus oriented. The computer retains a record indicating how many counter-clockwise one-sector steps are thus needed for each target tile; any set of source tiles, once thus oriented, may be presumed to have its tiles in their canonical state.

(Since every target area and source tile, at this time, is characterized by only three numerical values, the "rotation" consists only of changing the mid-edge values. For example, with square tiles, to perform a 90 degree counter clockwise rotation, the operations are: set the new mid-right value to the previous mid-bottom value and to set the mid-bottom to minus the previous mid-right value.)

Thus, tile swapping starts and proceeds to completion without involving any reorientations of either target areas nor tiles.

At the end of tile reconfigurations, the complete set of source tiles will resemble the target with its mis-oriented (pre-rotated) regions, which condition is corrected by reversing the original changes. More importantly, the source tiles are effectively rotated in parallel so that the source tiles as a whole resemble the original target regions, and it is their values, as re-oriented, that are output from the program.

Following the 'pre-rotation' calculation step comparative values between the piece image and the regional image are then calculated. A great number of technologies have provided calculation methods for comparing two images, and these can be arbitrarily used. However, the present example utilizes a method derived, in a most general sense, from brightness characteristics values at three points, being at the center C, in the middle at the right edge X and, in the middle at the bottom Y of the tile, as shown in the figure.

In each case, the three brightness characteristics are the values of a best-fitting plane at those three points: the central value of said plane (being the plane's average value) at C and the values of that plane at the center X of the right edge and at the center Y of the bottom edge. Source tiles that are mathematically defined need no further explanation. A meticulous mathematical definition might be that it is the plane from which the root mean square of deviation of all pixel values is a minimum. For the present purpose, an effective means of approximating the rightward and downward vectors comprising the gradient is by summing subareas.

Figure 17:
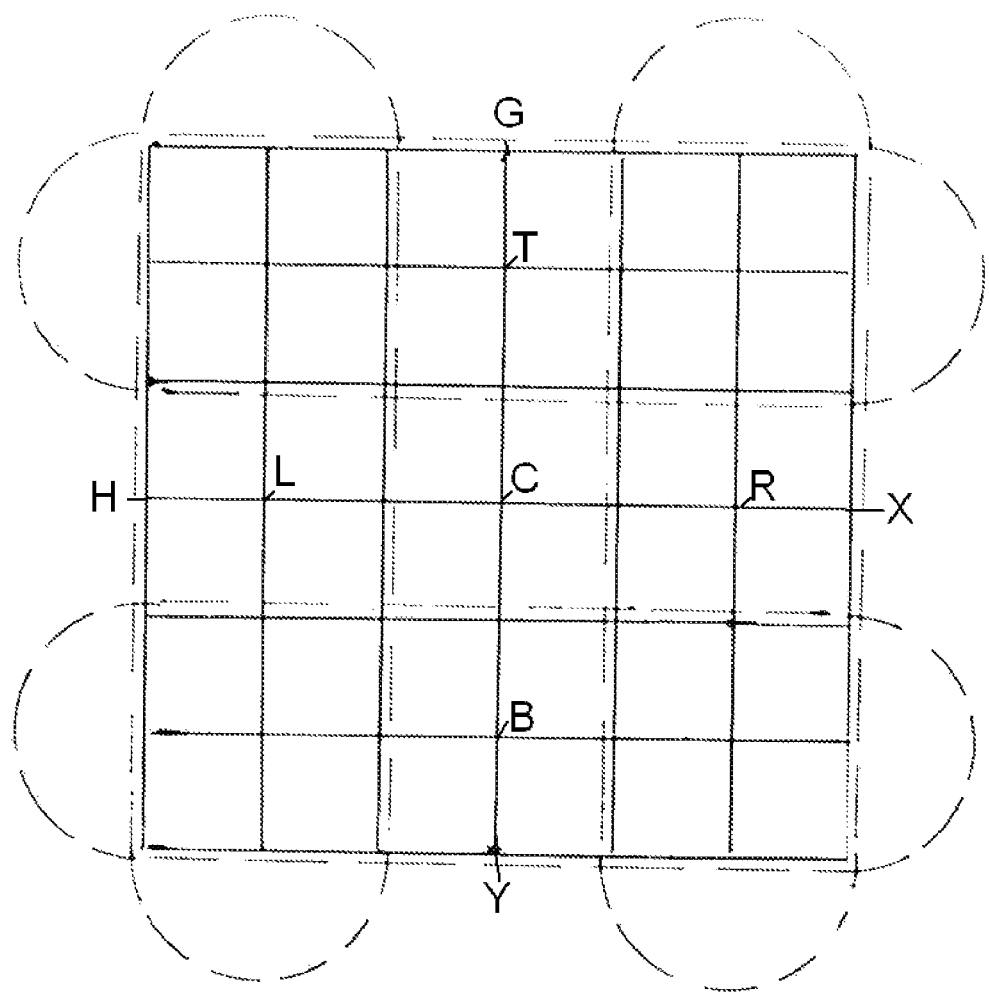
FIG. 17 is a diagram illustrating the calculation of values underlying the characterization of a target image region/area to be represented by a puzzle piece.

More particularly, as shown in FIG. 17, a target area to be represented by a puzzle piece is defined as follows:

The target area is partitioned/divided into 6×6 subareas, (pixels), and is characterized by Average brightness (considered as the average of the 36 subareas brightness and taken at the center C);

Rate of brightness increase (gradient) rightward (taken at point X, the center of the right edge minus that at the center C);

Rate of brightness increase downward (taken at point Y, the center of the bottom edge, minus that at the middle C The two rightmost and the two leftmost columns forming sets of 12 pixels each (in the encircled areas) are each averaged and those values attributed to points R and L, respectively, which are each spaced one pixel in/towards C from points X and H, at centers of right and bottom the edges, respectively.

Similarly, the 12 pixels in each of the two top most and bottom most rows (in the encircled areas) are averaged to determine values attributed to the points T and B, respectively, which are each spaced one pixel in/towards C from points Y and G, at centers of bottom and top edges, respectively.

The rate of increase of brightness rightward is taken to be the brightness value at R minus that at L, (4 pixels distant); thus the recorded value at X, three pixels to the right of center is ¾ of the R–L value. Similarly, the recorded value increment at Y, over the center C (average) value is ¾ of the values for a similar difference of averages of the 12 pixels of the sets of the two top rows and the 12 pixels of the two bottom rows. The direction values are signed to reflect whether brightness is increasing or decreasing to the right.

In the context of the many other approximations involved in the overall rendering of a final picture, this simple method is useful and usually sufficient.

The mismatch value between the two images increases as the difference in brightness increases; for instance, the brightness at the center of regional image A (320) is Atc (A tile central), and the brightness at the middle on the right side and at the middle on the bottom side are Atx (A tile x) and Aty (A tile y), respectively. Moreover, the brightness of each position of piece image A (321) is Asc, Asx, and Asy, respectively.

Furthermore, the brightness at each of these points on regional image B (322) and piece image B (323) is similarly represented as Btc, Btx, Bty, Bsc, Bsx, and Bsy.

As shown in FIG. 9, using these values, it is possible to find the mismatch value by the following calculation when piece image A (321) overlaps regional image A (320) (S123).

$$AatA=(Atc-Asc)(Atc-Asc)+(Atx-Asx)(Atx-Asx)+(Aty-Asy)(Aty-Asy) \quad \text{(Formula 1)}$$

Similarly, when piece image B (323) overlaps regional image B (322) (S124), $$BatB=(Btc-Bsc)(Btc-Bsc)+(Btx-Bsx)(Btx-Bsx)+(Bty-Bsy)(Bty-Bsy) \quad \text{(Formula 2)}$$

Furthermore, in cases in which the piece image is switched, when piece image B (323) overlaps regional image A (320) (S125), $$BatA=(Btc-Asc)(Btc-Asc)+(Btx-Asx)(Btx-Asx)+(Bty-Asy)(Bty-Asy) \quad \text{(Formula 3)}$$

When piece image A (321) overlaps regional image B (322) (S126), $$AatB=(Atc-Bsc)(Atc-Bsc)+(Atx-Bsx)(Atx-Bsx)+(Aty-Bsy)(Aty-Bsy) \quad \text{(Formula 4)}$$

Moreover, when pieces A and B are in regions A and B, respectively, the total mismatch value in regions B and A is calculated (S127) (S128) and compared (S129). Specifically, when (Formula 5)

$$((AatB+BatA)<(AatA+BatB)),$$

processing involves switching the positions of pieces A and B.

In general, the above-mentioned comparison processing (S12) is repeated so that the mismatch values are calculated in succession for all combinations of pieces and the positions are switched. The optimal piece arrangement (32) is determined (S13) when the comparison has finished for each combination of pieces.

In other words, the method involves an iterative, relaxation process consisting of progressively reducing the sum of all mismatches for all pieces (source tiles) with all target regions by a succession of operations each of which exchanges two pieces (source tiles) assignments to their target regions if the sum of their respective mismatches with the respective target regions is lessened by such exchange.

Consider the target regions and pieces paired 1:1 in linear sequence locations 0 thru 299.

Each pass or cycle consists of 300 comparisons of two locations A and B;
if piece currently at A and piece currently at B would result in lower sum of their mismatches vis-a-vis their target locations, they are exchanged, (piece currently at location A goes to location B and piece at B goes to location A.)

In the most simple approach, in each pass, location A starts at 0 and proceeds to location 299; at each of those positions, location B is some number of positions ahead. For example, when location A is 0, 1, 2, 3, 4, and the "distance-ahead" is 16, then location B would be 16, 17, 18, 19, . . . respectively. (B's location wraps around: i.e. when location A is 282, 283, 284, 285, location B would be 298, 299, 0, 1, . . . )

Thus, the first pass consists of testing every location A with the one just ahead of it ("positions ahead" is 1). In the second pass, positions-ahead is 2, in the third pass, it is 3, etc. By the end of 300 passes, each of the 300 positions A have been tested against every one of the other 299 as position-ahead has increased from 1 through 299). Actually, each pair has been tested twice, for example, the pair of location A=137 and B=215 is again tested (possibly with newer-yet contents) when A=215 and B=137.

The simple procedure as typically settles, with no further improvement to be found, by the end of 1200 or 1500 passes (i.e. 360,000 or 450,000 comparisons).

However, a more efficient approach is believed as follows:
1) Arbitrarily assign pieces (source tiles) to target regions/areas;
2) Compute and save a complete array of initial mismatch values; and
3) Make n passes, each of which examines all pairs of assignments, exchanging tiles if and when the sum of their mismatches is lessened (at which time, the array of mismatches is updated). In the case of 300 target regions (corresponding to a 300 piece puzzle), the process for one pass is For each distance ahead d in the array from 150 through 449

For each first point f in the array 0 thru 299

Test mismatch of location 97f mod 300 with location (97f+d) mod 300

If sum of mismatches would be less, swap and update mismatch table.

The modulo 300 applies as there are 300 pieces and therefore locations wrapped around at the end of each cycle of 300 mismatch comparisons.

Advantages of choosing a large separation distance (150 through 449) target regions/areas, (instead of starting with adjacent pairs of regions and progressively increasing their separation by one at the end of each 300 comparison cycle), are that, whereas adjacent regions tend to have relatively similar brightness characteristics, widely spaced regions (almost one half of region-count) are more different, producing many changes (swaps/exchanges) early on. Typically, the first pass produces 95% of the changes, the second 4.5%, the third 0.5% (and the 4th none). Additionally, the changes seem random to a user viewing the changes on a screen. Furthermore, as 97 is a prime number, all locations are tested This process is fast and efficient as not requiring sorted lists and tends to make large improvements early on such that the process can be stopped after 3 passes/cycles, or after few swaps/pass, or by timeout.

(Additionally, for a faster start, the first pass skips 'f' locations with low mismatches.)

The choice of a wide separation of target regions coupled with the step of saving the comparison/mismatch values may provide a reduction of approximately one half the processing steps required with starting with closely spaced pairs of regions and only saving comparison values at completion to provide the final array (display or arrangement table).

The specific comparison program is as shown in the following Table 1 in which:

AatA is mismatch of tile A at A's currently assigned target region/area

BatB is mismatch of tile B at B's currently assigned target area

AatB is the prospective mismatch of tile A at B's current area

BatA is the prospective mismatch of tile B at A's current area)

TABLE 1

```
/*calc mismatches*/
AatA = mismatch (colA,rowA,colA,rowA); /*corresponds to formula 1*/
/*mismatch value when piece image of colArowA overlaps regional image of colArowA is
calculated*/
AatB = mismatch (colA,rowA,colB,rowB); /*corresponds to formula 2*/
/*mismatch value when piece image of colArowA overlaps regional image of colBrowB is
calculated*/
BatA = mismatch (colB,rowB,colA,rowA); /*corresponds to formula 3*/
/*mismatch value when piece image of colBrowB overlaps regional image of colArowA is
calculated*/
BatB = mismatch (colB,rowB,colB,rowB); /*corresponds to formula 4*//*mismatch value
when piece image of colBrowB overlaps regional image of colBrowB is calculated*/
if (AatA + BatB < = AatB + BatA)return(0); /*corresponds to formula (5)*/ /*proceed to next
at return value 0 if the sum of mismatch values of formulas 1 and 4 is smaller than the sum
of formulas 2 and 3*//*if not, switch the position of the piece image (image surface or
canvas) as follows*/temp = canvas [rowA][colA];
canvas[rowA][colA] = canvas[rowB][colB]
canvas[rowB][colB] = temp;
/*definition of mismatch function for calculating mismatch value*/
Each column and row number of the piece image of column C row C and the regional
image of column C row C serves as the argument.*/Long mismatch (short Ccol, short Crow,
short Tcol, short Trow)
{long Cctr,Crit,Cbot,Tctr,Trit,Tbot,miss,edgedist,returnval;
Cctr=canvas[Crow][Ccol].ctrval;
/*Center brightness (ctrval) of column C row C piece image (canvas) serves as Cctr.*/
Crit=canvas[Crow][Ccol].ritdval;
/*Right end brightness (ritdval) of column C row C piece image (canvas) serves as Crit.*/
Cbot=canvas[Crow][Ccol].botdval;
/*Bottom end brightness (botdval) of column C row C piece image (canvas) serves as
Cbot.*/
Tctr=target[Trow][Tcol].ctrval;
/*Center brightness (ctrval) of column C row C regional image (target) serves as Tctr.*/
Trit=target[Trow][Tcol].ritdval;
/*Right end brightness (ritdval) of column C row C piece image (target) serves as Trit.*/
Tbot=target[Trow][Tcol].botdval;
/*Bottom end brightness (botdval) of column C row C piece image (target) serves as Tbot.*/
returnval = (Cctr−Tctr)*(Cctr−Tctr) +
    (Crit−Trit)*(Crit−Trit) +
        (Cbot−Tbot)*(Cbot−Tbot);
    /*The square of each difference in brightness between the piece
image and the regional image is totaled and returns as the mismatch value
(returnval).*/return(returnval);
}
```

In arrangement determination step (S13), a piece arrangement determination part (14) performs processing whereby the determined arrangement and the angle of rotation for the piece are defined by matching each piece with the angle of rotation of the regional image for which the arrangement has been determined.

In essence, as depicted in FIG. 10, the regional image was rotated for comparison processing (S12), but even if the corresponding pieces are lined up in a row, a finished image will not be obtained because the regional image has been improperly rotated and, as mentioned above, reversing values must be applied.

Therefore, the angle of rotation of the regional image, for instance, second tile (312), was rotated 270 degrees and therefore, the piece image arranged at the position of this second tile must be rotated −270 degrees in order to correct the position.

The direction of the piece is rotated when the user lines up the actual pieces; therefore, the information on direction can be output all at once by this unit (1).

Once the angle of rotation has been defined by piece arrangement determination part (14), the system proceeds to an arrangement results output step (15) by an arrangement results output part (15).

Here, an arrangement table or chart is output based on the identification codes that are marked on each piece. The simplest example of identification codes is to write numbers on the pieces.

Here, arrangement results output part (15) performs image processing whereby each piece image is combined in accordance with the arrangement results. The results can be output as the finished image data. By means of the present invention, the output can be in the form of an arrangement table only, the finished image only, or a combination of the two.

Figure 12:
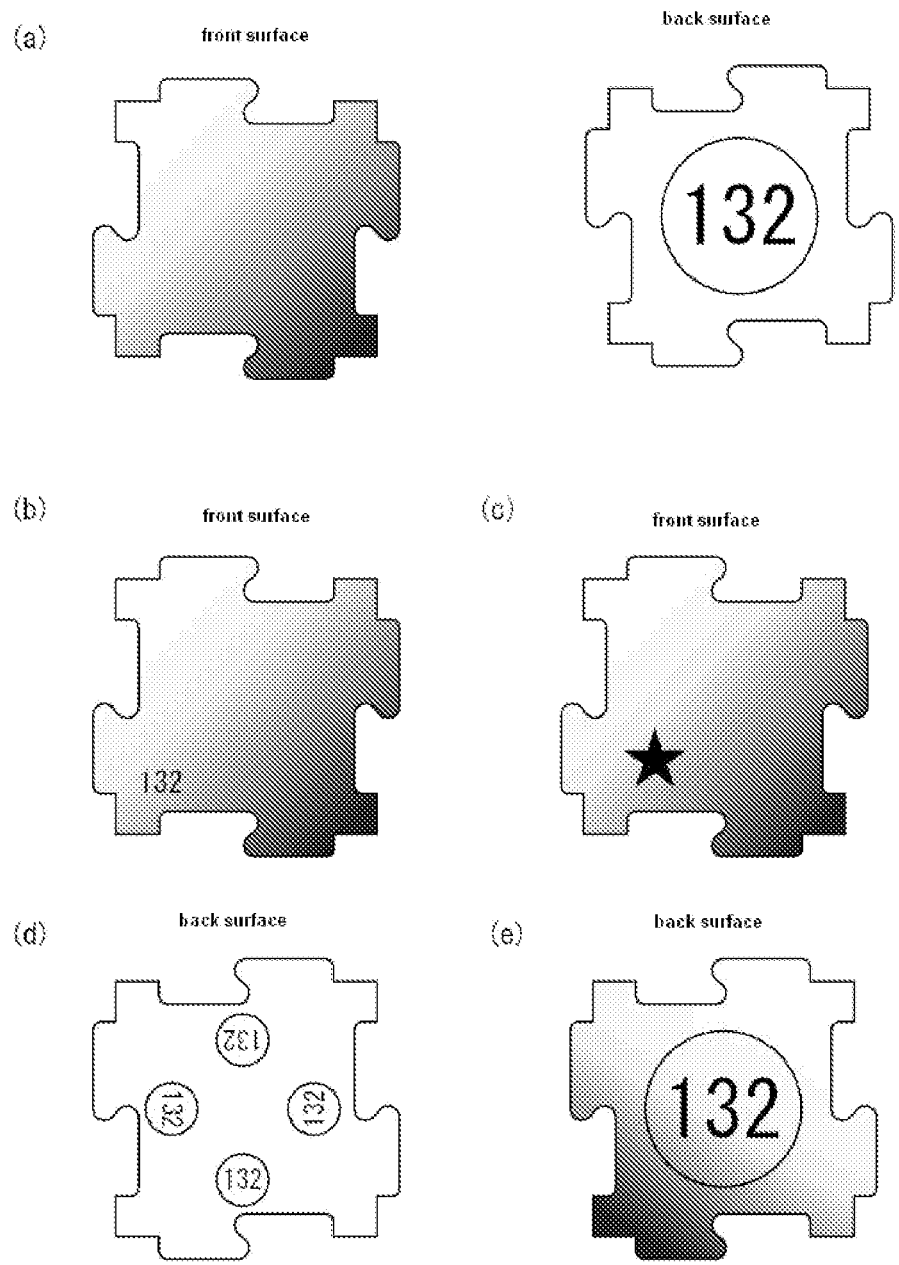
FIGS. 12 (a)-(e) are views of front image faces and rear faces, variously, showing different indicia forming identification codes marked thereon.

FIG. 12 shows an example of an identification code display method. As shown in FIG. 12 (a), it is possible to make a design on the front surface and print a number on the back surface. It is also possible to print small numbers on the front surface, as shown in (b). Symbols can also be used as in (c) as long as they can be identified. It is not necessary to use individual identification codes for each of the pieces as long as the pieces can be identified by the status of each decoration.

When numbers or characters are used, the user can determine the direction of a piece by the direction of the number or character. For instance, when the direction in which "132" is read in FIG. 12(a) serves as 0 degrees and the numbers are rotated, if they are rotated a specific angle in the direction opposite that indicated in the arrangement table, this direction of "132" is direction indicated in the table. In the case of −270 degrees, the piece should be turned counterclockwise 270 degrees, for example.

It should be noted that symbols can be aligned in their original direction by matching the position of the symbols when they are written toward an angular point, as in FIG. 12(c).

Figure 18:
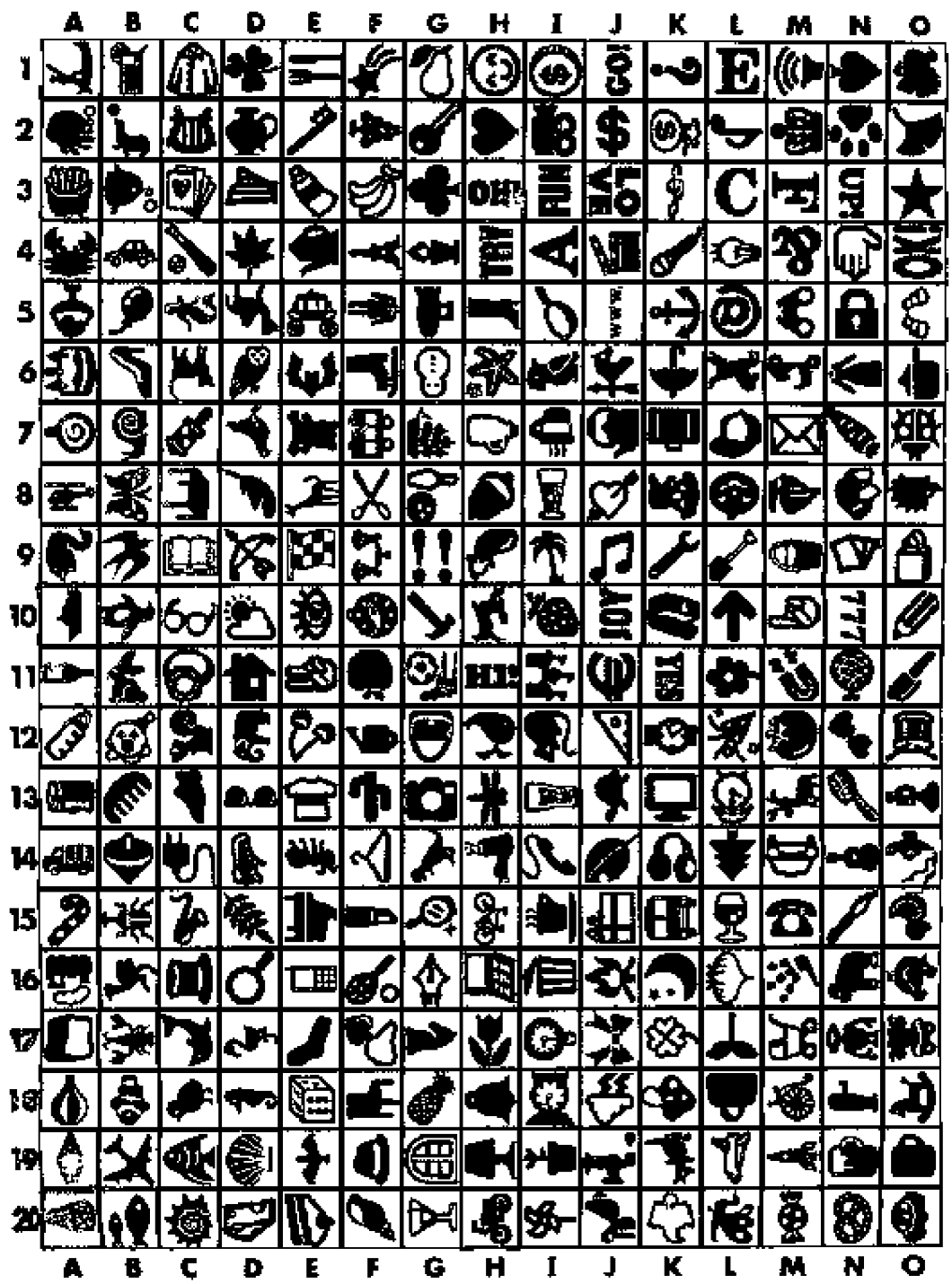
FIG. 18 shows a piece arrangement chart or table with inherently directional piece identification codes.

Another example of a piece or source tile arrangement table or chart of inherently directional, piece identification codes is shown in FIG. 18.

In contrast to the above-mentioned, it is also possible to print identification codes so that they can be seen from each direction in which arrangement is possible or from some of the directions in which arrangement is possible. For example, in the case of the puzzle of the present working example, the identification codes are printed in 4 directions so that one of the codes stands upright for each arrangement as shown in FIG. 12 (d) and the user is unaware of the correct direction. In order to confirm the correct interpretation in this case, the arrangement can be compared with a display of the finished image showing the correct arrangement results.

It should be noted that it is possible to print not only identification codes, but also the same decoration as on the top surface on the back side of each piece as in FIG. 12(e). This decoration can have the same or a different shading and color than that on the top surface. By printing the decoration in this way, it is possible to make gradually creating an image enjoyable, even if it is done by assembly according to identification codes.

As shown schematically in FIGS. 15a and 15b, in another example, the indicia are marked on the front, image forming faces and have surfaces having one of a different reflection rate, gloss and roughness from the patterning on the image forming faces of the pieces so that the identification codes can be seen when viewed from one of an oblique angle, as shown in FIG. 15b, (or in a direct light), so that the puzzle mosaic can be advantageously assembled from the front while the assembler is viewing the image being formed during tile assembly, but so that the indicia forming the identification codes become so indistinct (as shown in FIG. 15a) as not to significantly detract from the recognizable likeness of the assembled mosaic image to the target image when the assembled mosaic image is viewed from the front (or in an indirect light), respectively.

Specifically, the indicia are defined by a clear varnish and the puzzle set includes a container of a similar varnish.

The output (33) method of arrangement results output part (15) is an arbitrary method.

One example is to output the arrangement (represented by column and row) and the direction of each piece as shown in Table 2.

TABLE 2

| Piece No. | Column | Row | Direction |
| --- | --- | --- | --- |
| 131 | 11 | 20 | 90 degrees |
| 132 | 5 | 8 | 0 degrees |

It is also possible to use a method whereby the piece outline, when it is actually arranged, is represented and an identification code is printed on each piece. In this case, a visual image is obtained and it is therefore possible to enjoy finding and assembling the pieces in order.

Figure 13:
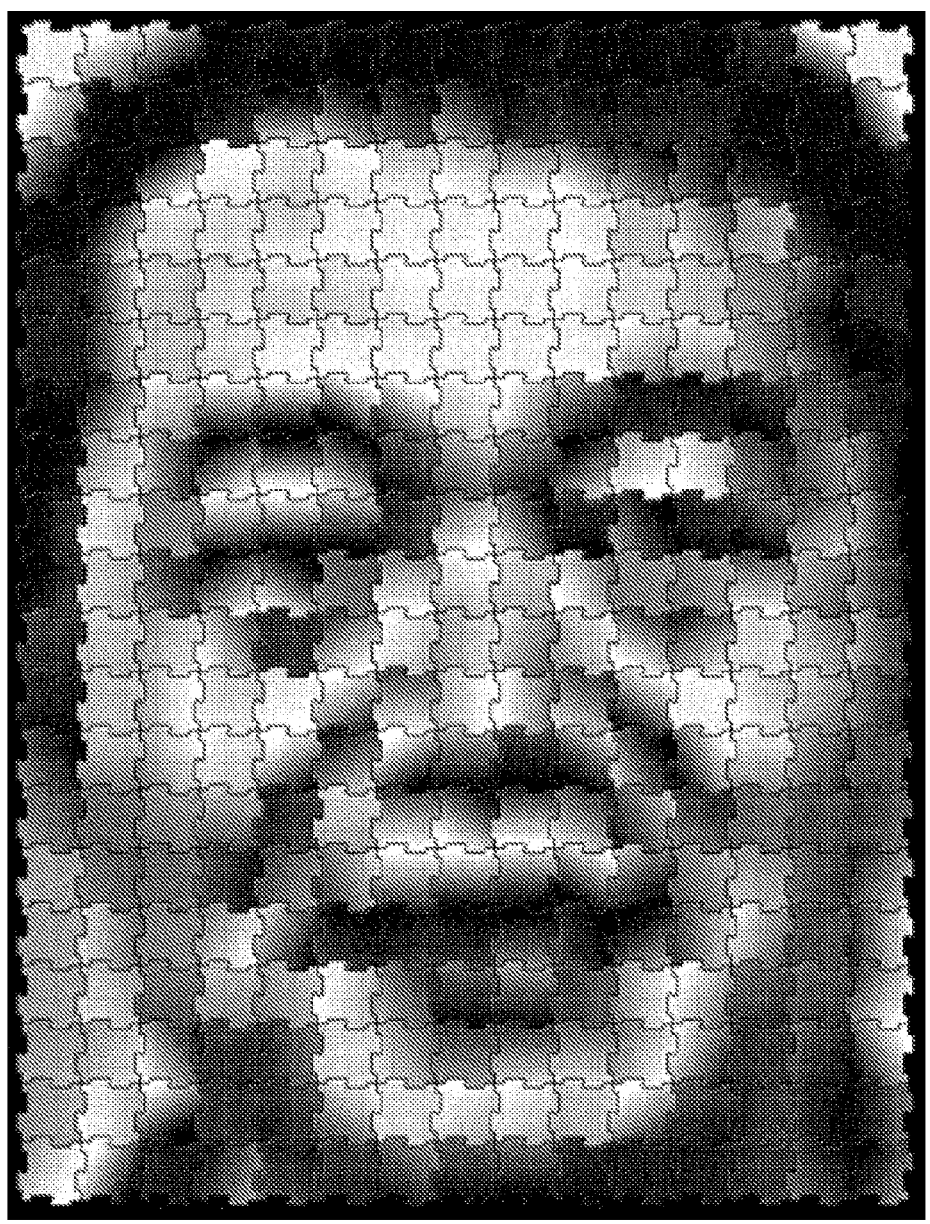
FIG. 13 shows an example of a finished image obtained as the output of the arrangement calculation unit of the present invention.

As previously described, it is also possible to output an assembled image as the arrangement results (33) or chart. FIG. 13 shows an example of a finished, assembled image of the present invention. As can be seen from the figure, a semblance of an original image can be reproduced to the extent that an individual can be easily recognized, even if relatively few pieces are used, by employing gradation and brightness on the pieces and rotating the design on each piece appropriately.

It should be noted that it is also possible to output, as a reference, the finished image data together with the arrangement table or to display only the completed image data.

Arrangement table (33) of the output results is transmitted through Internet (2) to user terminal (3) and output on the screen at user terminal (3) or printed from a printer.

By means of this structure, a series of systems is created whereby arrangement table (33) can be obtained when the user transmits original image data (30) to this unit (1) via the Internet.

When the finished image data cannot be displayed at a terminal, such as when user terminal (3) is a portable telephone terminal, it is possible to use the method whereby rather than transmit the finished image, a printed image is sent by mail or by similar solutions.

The structure has been described where only brightness is used in the calculation formula by above-mentioned image comparison part (13), but again, it is also possible to use a combination of hue and brightness. Moreover, comparison by these properties is also possible using the average brightness and other statistics.

Monochrome pictures can be obtained by using the grayscale method above, utilizing the three characteristic values of average brightness, magnitude of brightness gradient and direction of brightness gradient and, tinting all source tiles by a color such as sepia, or blue, or red. It remains, nevertheless, essentially as a monotone sequence. Tiles can, however, be made in significantly three-dimensional color. However, for human vision, the most important characteristics are brightness and its distribution in the visual field. Humans are much less sensitive to hue which is therefore of secondary importance.

For color tiles, the brightness gradient (in two orthogonal directions, or direction and magnitude) is retained as two of five defining values of a tile; the other three are separate values of averages over the region of red, green, and blue as they are commonly used in computer graphics. Since target pictures will usually be displayed in terms of these three primaries, brightness gradient can be computed from the sums of the individual brightness of each of the three colors throughout a region.

In designing a set of tiles as puzzle pieces, it is best to uniformly distributed their average values uniformly spaced (as atoms' centers in hexagonal or face-centered cubic lattices) in the traditional ellipsoidal volume used to define colors in cylindrical coordinates (the vertical axis goes from black at the bottom to white at the top; azimuth around the center represents hue; distance from the center represents saturation). In such a volume of equally spaced average colors, there will automatically be a few at top and bottom, and several at central levels—very much the hump-shaped distribution wanted for average brightness. But because of the several colors per level, rather than one in the grayscale case, there must be fewer levels of average brightness and a lesser number of brightness gradients; otherwise the number of distinct tiles would exceed reasonably acceptable limits.

In the above-mentioned example, flat pieces were used assuming a conventional jigsaw puzzle, but the pieces of the present invention can have any morphology. They can be cubes or cuboid block-shaped pieces, domino game pieces, erasers, and the like. The material can be paper, plastic, wood, metal, fabric, or other materials. Flexible members such as stuffed toys and cushions can also be used as members.

Any piece that can be arranged with adjacent pieces can be used, and it is not necessary to assemble pieces using recesses and protrusions around the outside edges.

Multi-faceted "tiles," especially cubes, provide several possibilities of design and use. Of course, only one face of each of the tightly packed cubes can be visible at one time, an obvious constraint on either the program or the user's method of using the program's output. Five faces may serve for picture-making, reserving the sixth to display identification and orientation. Or all six can be used pictorially with small ID and orientation indications on one or even on all of the faces. The computer program for defining layout for a particular target picture is very similar to that for single-surface tiles. Four specific designs and methods of use are suggested:

(1). A normal color system is used, producing a layout chart for all cubes. The user then decides which of the cubes' faces to present. For examples, the cubes might alternatively show the picture in gray-scale, sepia, earth colors, forest colors, muted colors or saturated colors. The same layout chart would be used for each in turn; the tiles are produced simply by biasing or limiting the color tones as in more or less traditional photographic manipulation.

(2). A user might wish to produce his/her face from a cut-up picture of some famous political figure, or scientist, or musician, etc. As an example, there could be a set of cubes whose faces show alternatively portraits of five or six famous scientists. Preparation of the cubes requires some care in processing the pictures to cut up, but this is really the same problem as preparing a target picture in brightness and local contrast characteristics to match the standard characteristics of the normal gray-scale flat tile set. Beyond that, each face of each tile can be further analyzed and adjusted to better suit its role.

(3). All faces of the cubes may serve as a particularly sensitive gray-scale matching to a target image. Each cube stands for one of the flat tiles of a gray-scale set and the program performs its normal function for flat tiles, with the new feature afforded by the cubes and the final touch-up: on its various faces, each cube displays a cluster of five or six slight deviations from the corresponding tile. For example, a face could be slightly darker or brighter, or its gradient of slightly more or lesser magnitude, or it gradient direction slightly more or less clockwise. The final step of the program is touch-up in the sense of choosing which face of that cluster best matches the target area.

(4). Cubes for color pictures in general can be designed and used as in (3) but each cube's various faces could present a tight cluster of average colors, but with the same brightness gradient properties. Thus, a better color picture can be made than by use of the same number of flat colored tiles.

When the pieces are block-shaped, it is possible to display an identification code on one of the surfaces and to print a design or character having a different color, color saturation or brightness on the other five surfaces. When the pieces are arranged such that all of the identification codes are on the top in accordance with the arrangement table, the top surface can be varied by 5 surfaces×4=20 by imparting directions for rotating the individual cube by identification code such as "rotate up twice and then rotate once to the right with this surface facing up." As a result, it is possible to provide an accurate finished image with a small number of pieces.

It is also possible to display the identification code on 2 or more surfaces and, for instance, using an opposing surface for the surface that represents the finished image. It is also possible to vary the color or design of the surface for displaying the identification code and list in the arrangement table which surface displaying an identification code should be used. Surfaces can also be differentiated by the type of characters used in the identification code by using numbers for some surfaces, the alphabet for other surfaces, and symbols or marks for yet other surfaces.

Moreover, it is also possible to use one surface for displaying the identification code and form a design having a different hue, saturation or brightness on the other five surfaces, with some surfaces being monotone, some surfaces being sepia, some surfaces having patterns from nature, such as leaves, and some surfaces being geometric designs such that the user is capable of creating a finished image by selecting a preferred pattern.

Assembling a puzzle can also be enjoyable when, once a monotone image is created, some of the blocks are turned to create a sepia image, and the like.

Moreover, when the piece aggregate of the present invention is provided with a 300-piece aggregate as one set, the user can complete a target image with greater precision by using the same or a different piece aggregate set. For example, when a user obtains two packages of the same 300 pieces in order to assemble a 600-piece puzzle, there are two of each piece having the same identification code. By means of the system of the present invention, an arrangement table can also be output using these identification codes.

In order to be able to use different piece aggregates, the method can be used whereby the identification code is displayed on each set, or a unique identification code can be imparted to the entire series of piece aggregates.

It should be noted that when the present invention is provided as a jigsaw puzzle, roughly 200 pieces or more, particularly 300 pieces or more, are preferred, as long as the design or characters are displayed on one surface only. A sufficient number of pieces is desirable such that the characteristics of an individual face can be identified in a finished image.

On the other hand, the original image can be more precisely represented by increasing the number of pieces, but there is an increase in the calculation volume of the system and the time until completion by the user becomes too long; therefore, usually 1,000 pieces or less, particularly 500 pieces or less, is preferred. A characteristic of the present invention is that the number of pieces is easily increased in accordance with the preferences and capabilities of the user, as previously described.

The piece image design used in the present invention can also be individual photographs, and similar images. The image can be such that a single illustration, drawing or photograph is created by assembling all or a part of the puzzle by a specific rule. For instance, a piece image can be created by partitioning a single photograph of Mount Fuji into pieces.

In this case, the original photograph of Mount Fuji is completed by assembly as the pieces were partitioned, or a desired finished image can be assembled in accordance with the arrangement table of the present invention obtained as a result. In the former case, matching the colors and patterns as an ordinary jigsaw puzzle is enjoyable, while in the latter case, the uniqueness of being able to represent an original image and the anticipation of completing an unknown image is enjoyable. Therefore, the present invention is capable of providing a product that is highly amusing.

As mentioned above, a conventional approach when attempting to create pictures involves histogram leveling in which the overall brightness range is divided incrementally into equal divisions of brightness and the available pixels distributed equally in each division. Such approach is often considered to show a maximum amount of the overall subject matter of the picture and is generally considered desirable for a picture displayed at a usual picture viewing distance of several feet (as, for example, an assembled jigsaw puzzle hung on a wall). However, at such display distance, fine details of the picture often cannot be seen and is not therefore deemed important.

However, when solving the jigsaw puzzle, the mechanics of piece (tile) placement usually requires the assemblers to be much closer to the picture image fragments than the normal display distance. Notwithstanding, it is very important for the assemblers themselves to be able to enjoy recognizing fragments of the target image being progressively formed as they add each piece as this improves their sense of anticipation, providing important, and often needed, motivation to continue with a complex puzzle with a large number of pieces/tiles.

The fine detail, defined by individual pieces' respectively different brightness gradients, not seen from a distance, becomes more apparent close up and therefore it is desirable to increase the number of different gradients.

Unfortunately, particularly with a personalized set of tiles which must form an unlimited number of different, recognizable images unknown at the time of puzzle manufacture with tiles which are nevertheless, for practical reasons, limited in number, when the target picture areas and the puzzle pieces are distributed evenly throughout the brightness range to correspond with the histogram leveling, there may be insufficient variations in brightness/brightness gradient to optimally display fine detail to the close assembler for earliest optimal recognition of emerging image portions of the target picture, especially in very dark and very light areas. (This problem does not arise to the same extent with conventional jigsaws as the assembled pieces are usually cut from a picture identical with the target picture). Thus, in the context of jigsaw puzzle assembly from a personalized set of tiles, the conventional approach of histogram leveling is counter-productive.

In contrast to histogram leveling, histogram shaping is applied so that the pieces/tiles are in a humped population distribution providing are more puzzle tiles in the middle divisions and few at the bright and dark extremes. The target picture is processed according to a histogram of correspondingly hump shape.

Two advantages accrue. The first is that most target pictures have relatively little total area at brightness extremes of very bright and dark, (which would otherwise likely have resulted in a target picture with little discernable subject matter), and more pieces are therefore available to accurately reproduce almost all the target picture area. The second is that tiles in the middle divisions of average brightness can exhibit more variations in brightness gradients, (as shown in the diagram below), and more subtle changes in brightness resulting in fine details can therefore be reproduced, as seen in the right cheek of 'Einstein' portraits in bottom left of FIGS. 20a and 20b which show Einstein' face of ideal target tiles, prepared for assembly from sets of pieces, to which histogram leveling and histogram humping have been applied, respectively. Furthermore, in the upper right of the picture, there are a couple of tiles that are slightly sloped that had 'whited out' in the histogram leveled picture of FIG. 20a.

Additionally, increasing the number of different gradients provides more choice and flexibility in picture presentation.

Figure 19:
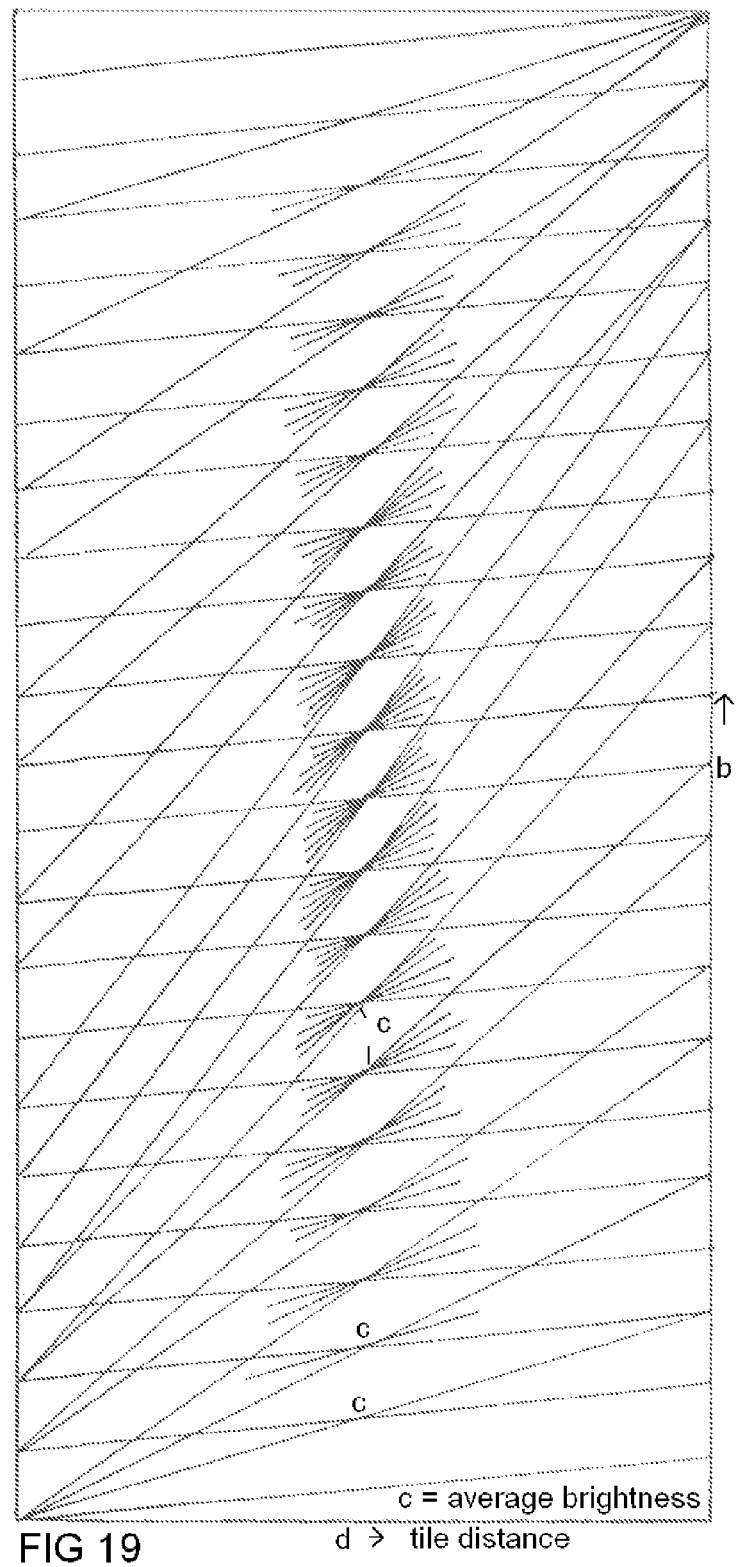
FIG. 19 is a diagram illustrating the larger number of different brightness gradients available adjacent middle values of average brightness than at more extreme average values of very bright and very dark.
Figures 20A, 20B:
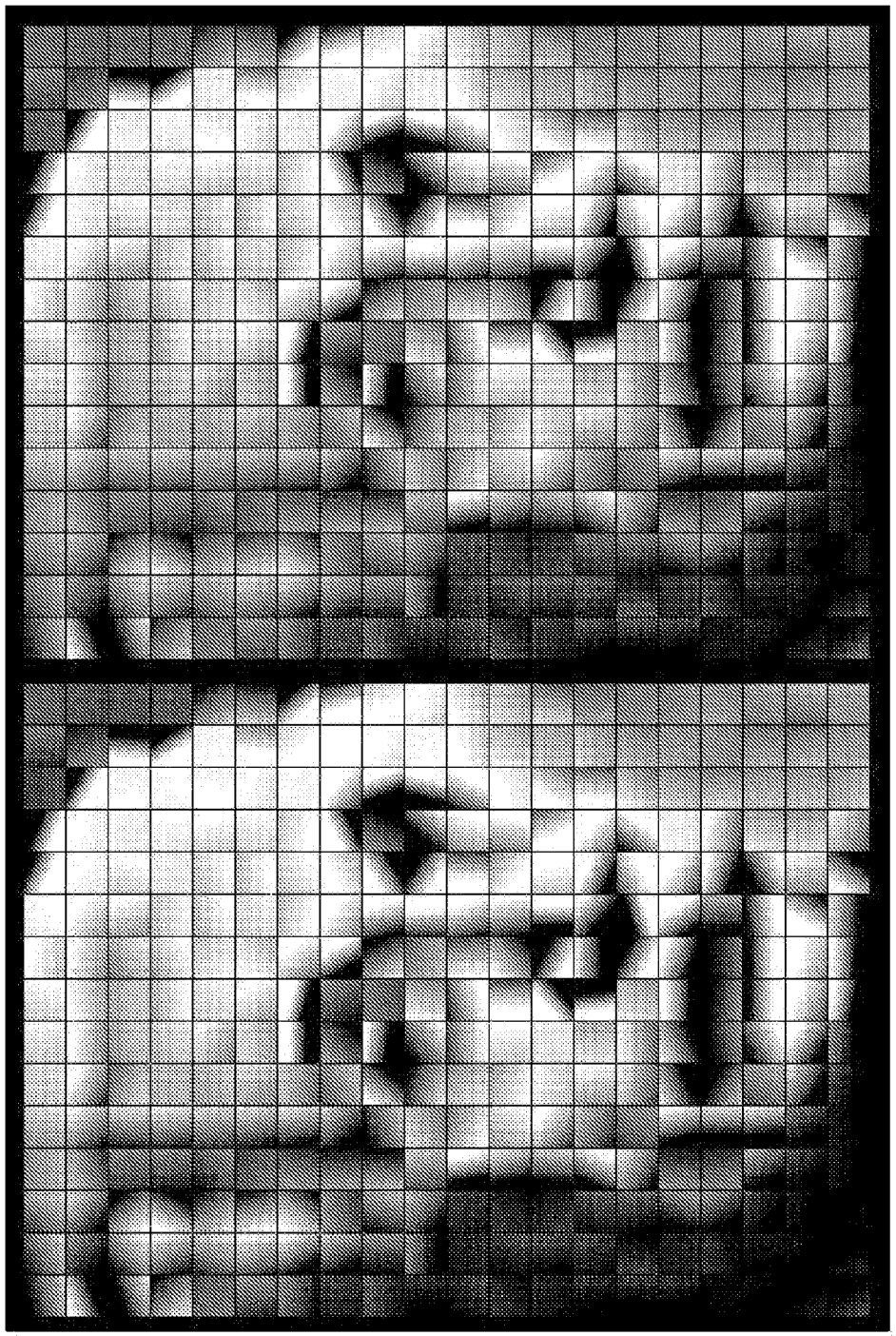
FIGS. 20a and 20b show Einstein' face assembled from ideal target tiles to which histogram leveling and histogram humping have been applied, respectively.
Figure 21:
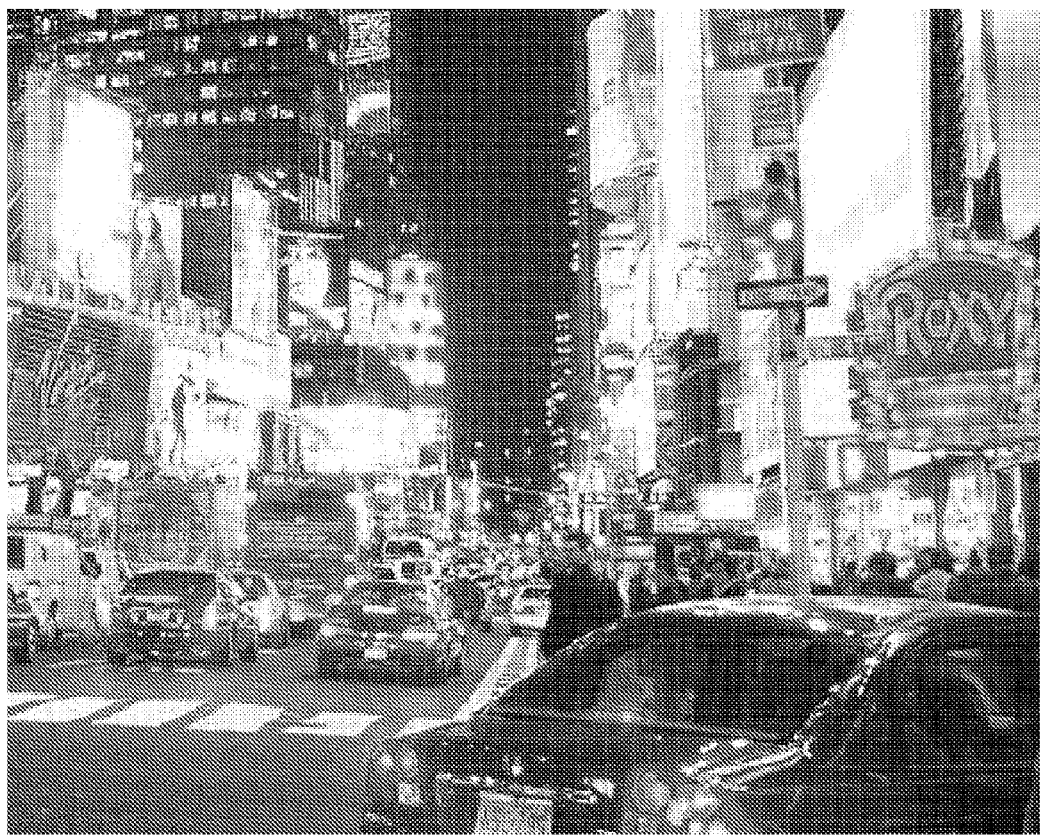
FIG. 21 shows an iconic source picture of Times Square.
Figure 22:
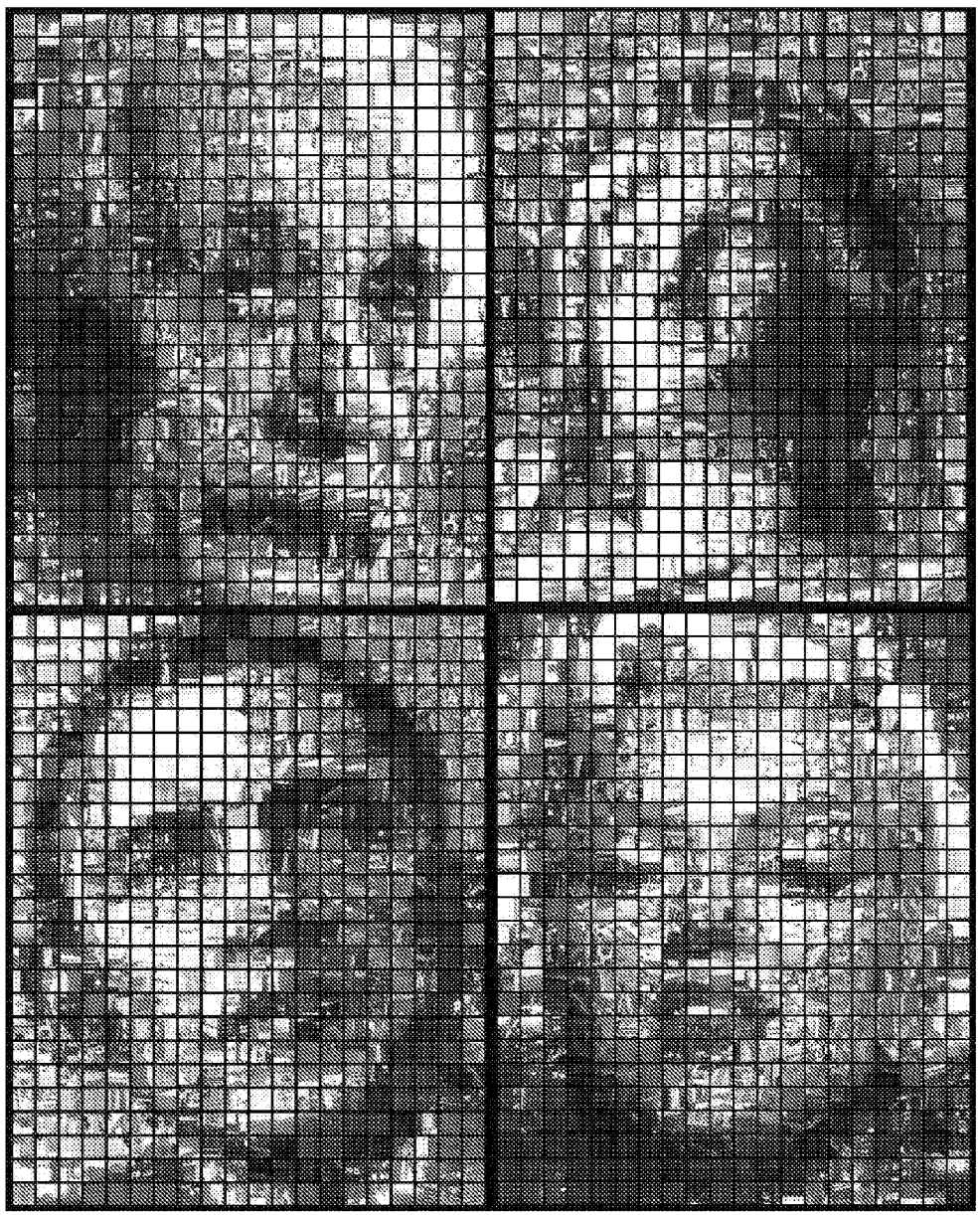
FIG. 22 shows four mosaic images: Einstein; Statue of Liberty; Obama and Marylin Monroe assembled from individual source tiles formed by partitioning the picture of Times Square.
Figure 23:
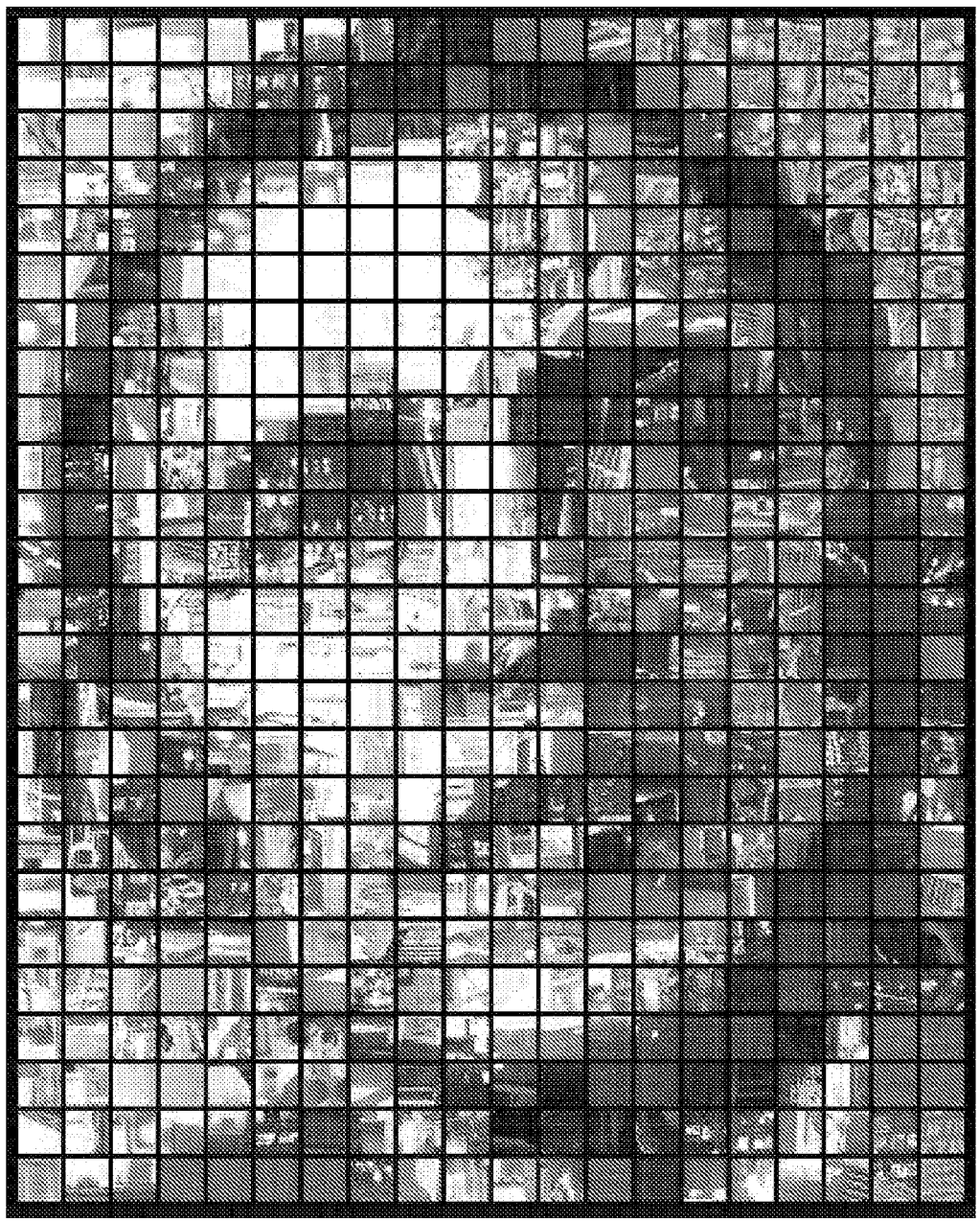
FIG. 23 shows a mosaic image President Obama assembled from individual source tiles formed by partitioning the picture above of Times Square with the caricature of Obama shown in FIG. 24 as a target (original) image.
Figure 24:
FIG. 24 shows the caricature of President Obama used as the target picture for FIG. 23.
Figure 25:
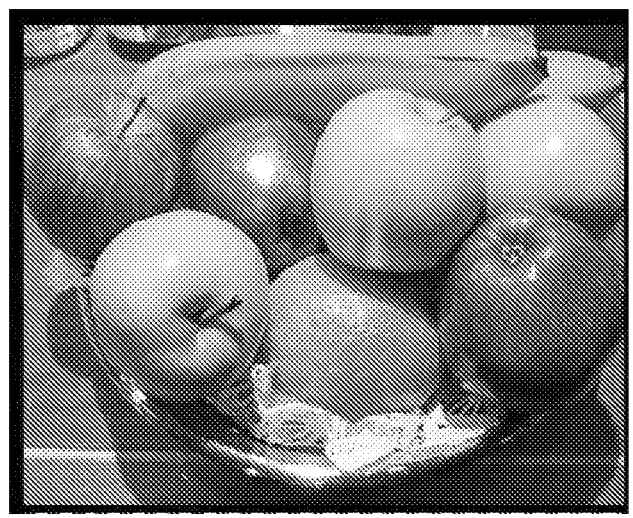
FIG. 25 is a source image of a bowl of fruit.
Figure 26:
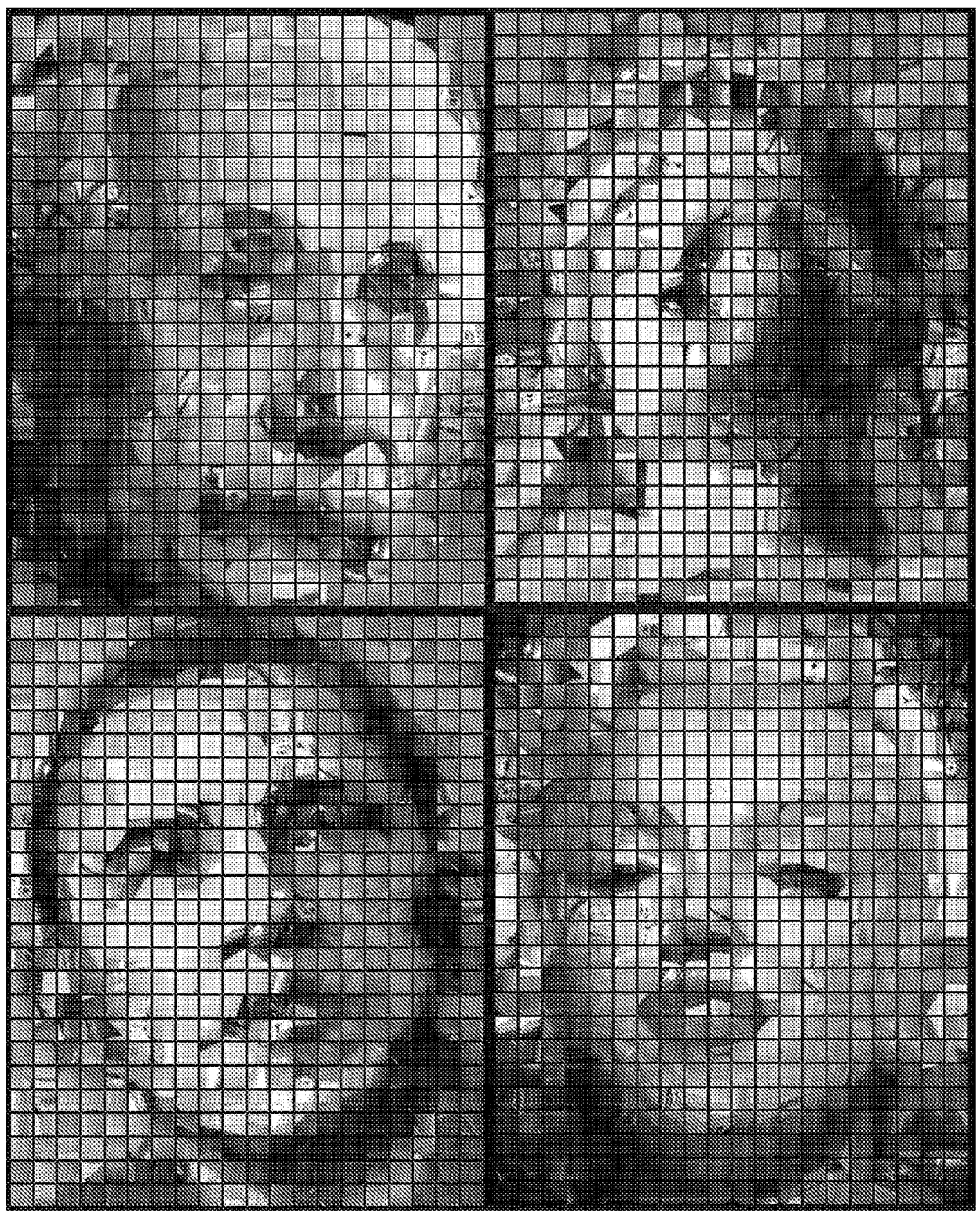
FIG. 26 shows the four subjects of FIG. 22 assembled from individual source tiles formed by partitioning the picture of the bowl of fruit shown in FIG. 25
Figure 27:
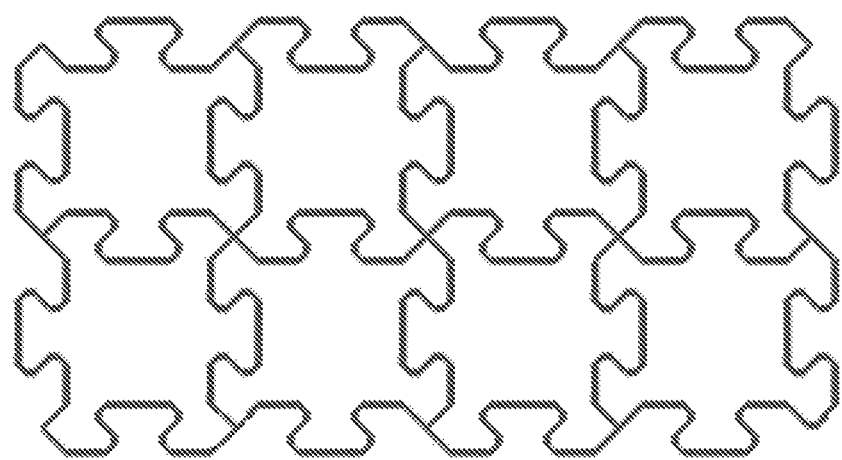
FIG. 27 is a schematic plan view showing another embodiment of identically shaped, two-faced pieces linked together in a group.
Figures 29A, 29B:
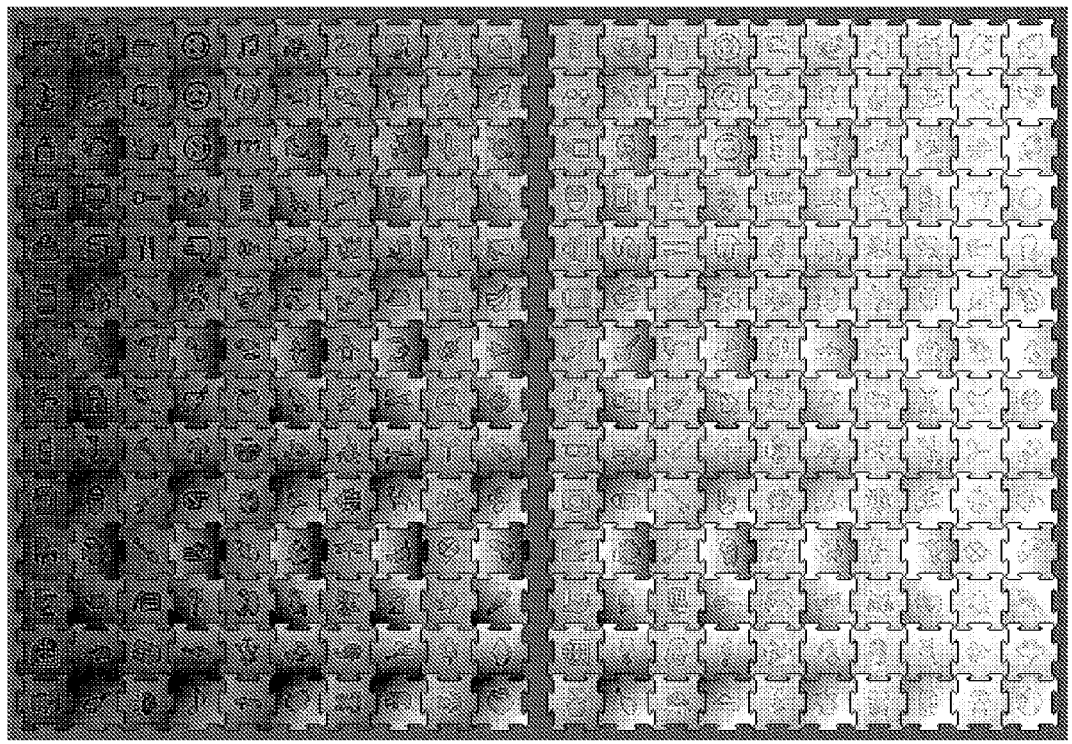
FIGS. 29a and 29b are plan views of opposite, front and rear, faces of a set of linked, two-faced pieces, showing piece identifying symbols, different for different pieces, but identical on an individual piece, being merely rotated through 90 degrees between front and rear faces, which are patterned to occupy, respectively, opposite, darker and lighter, halves of the total brightness range of the set.

A tile distribution table showing the different distributions of the tile populations of the 'histogram leveled' portrait FIG. 19a and the 'histogram shaped' portrait FIG. 20b is as follows:

| FIG. 20a: | 20 | 26 | 33 | 27 | 47 | 28 | 34 | 25 | 37 | 23 |
|---|---|---|---|---|---|---|---|---|---|---|
| FIG. 20b: | 13 | 24 | 28 | 42 | 49 | 36 | 32 | 41 | 21 | 14 |

Brightness range 0-230 divided into 10 divisions of brightness: 23, 46, 69 . . . 230

FIG. 19 illustrates the brightness b across puzzle pieces as a function of distance d across the tile, for various pieces whose average (i.e. central) values lie at different brightness levels c into which the brightness range has been divided. This diagram illustrates that with uniform brightness gradient within an individual tile, more distinguishably unique tiles may share a mid-level average brightness value than similar groups which sharing a darker or brighter average. In other words, a greater variation of brightness gradients is possible among tiles which have more central values of average brightness, providing more fine detail.

Alternatively, a hump-shaped distribution of average brightness, can consist of 22 divisions of average brightness with populations in ratios of approximately 1:2:3:4:4:5:5:6:6:7:7:7:7:6:6:5:5:4:4:3:2:1.

In alternative embodiments, a 500 piece set is provided and users can select the finished size such as 250, 300 or 400 pieces and receive an identification code/clue chart computed/calculated specifically for the chosen size.

Users can also change the ratio of the finished puzzle using the same set. For example, 10×30 pieces or 20×60 pieces provide good aspect ratios for a mosaic semblance of the human body.

Finally, the method for billing for the arrangement table using piece arrangement calculation unit (1) of the present invention and the structure of this unit will be described. As previously mentioned, by means of the present invention, the image that is printed on the pieces is unrelated to the finished image; therefore, first, the pieces alone are purchased and then the user who has purchased the pieces determines the desired original image.

Thus, for instance, a business model is established whereby a service for making a free arrangement table for up to two images is provided via the Internet and the user purchases additional arrangement tables as he wishes. Such a sales method is impossible with conventional jigsaw puzzles, but is possible for the first time through the piece aggregate of the present invention.

Figure 14:
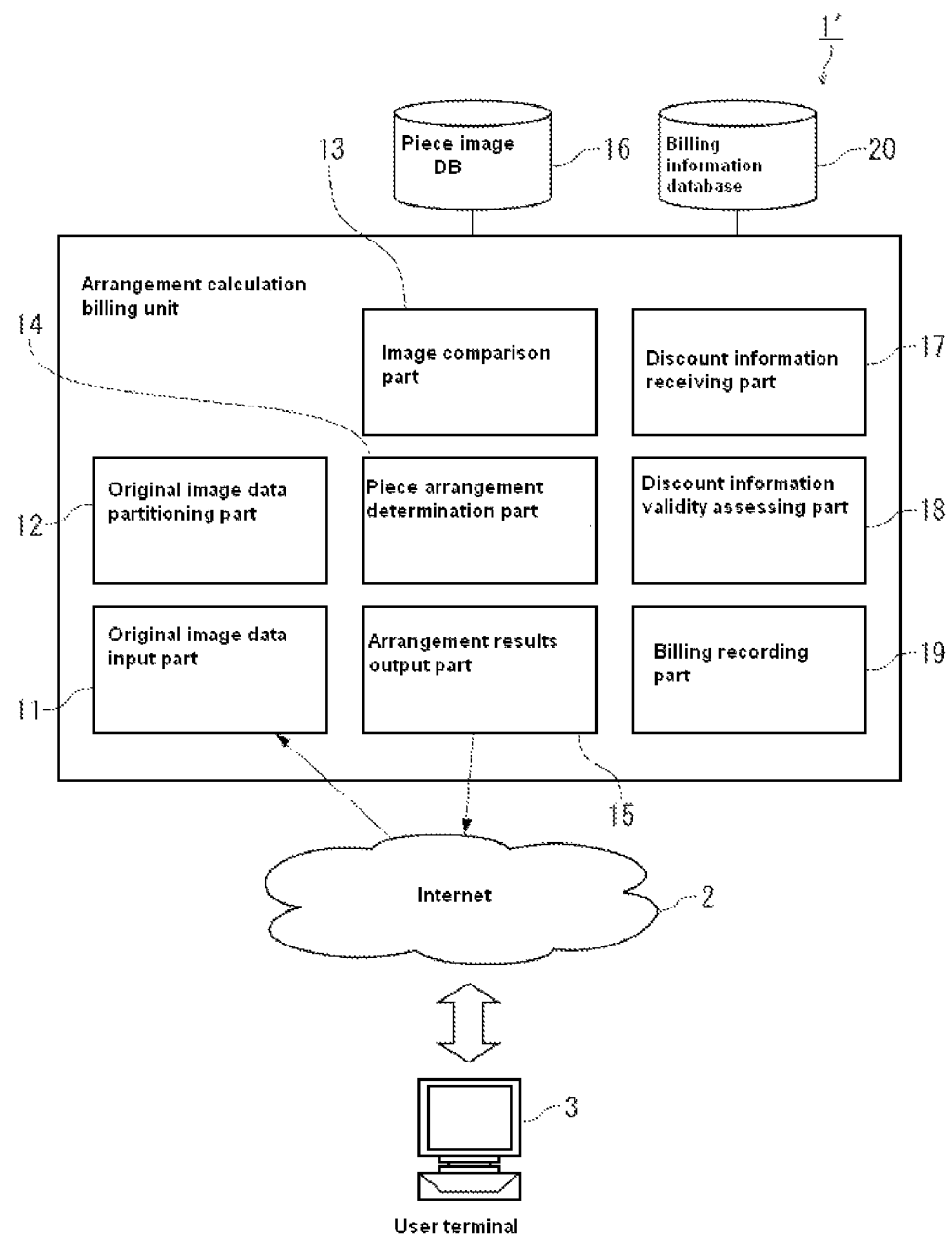
FIG. 14 is a chart of the billing system of the present invention.

Therefore, as shown in FIG. 14, in addition to unit (1) in FIG. 1, the present invention provides arrangement calculate billing unit (1'), which comprises a discount information receiving part (17), which receives information on free coupons or reduced-price coupons from user terminal (3); a discount information validity assessment part (18) for assessing the validity of the discount information; a billing recording part (19); and a billing information database (2) in which the billing history is stored.

Figure 15:
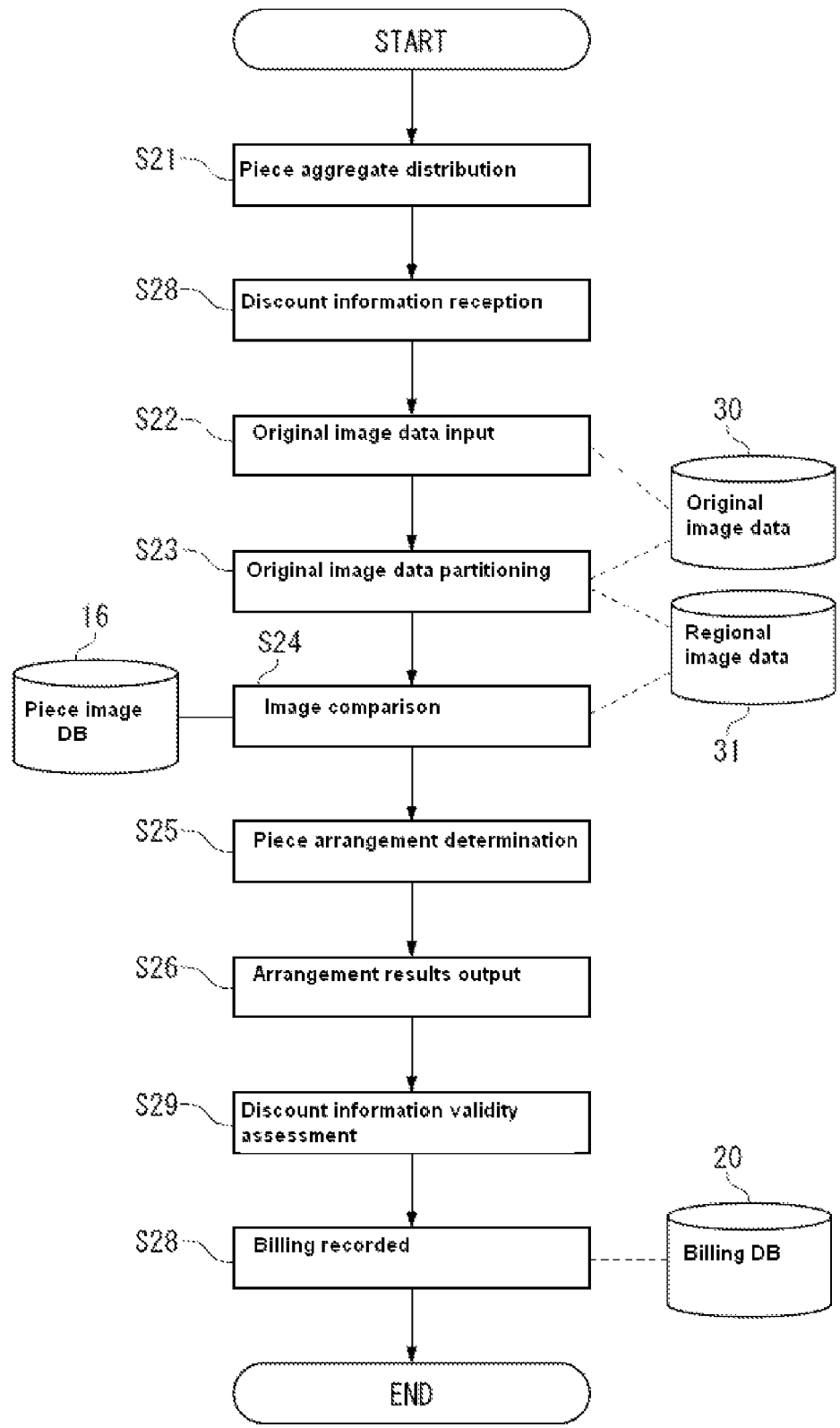
FIG. 15 is a flow chart of the billing processing method of the billing system of the present invention.
Figures 16A, 16B:
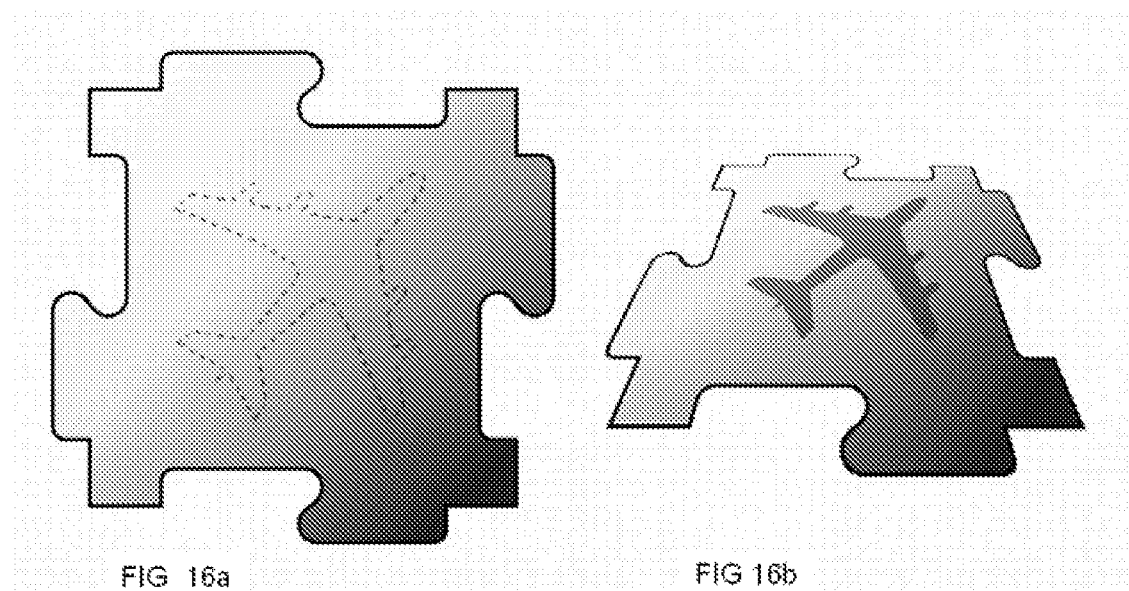
FIGS. 16a and 16b are, respectively, plan and oblique perspective schematic views of an image face of source piece, illustrating the reduction in visibility of a directional identification code (airplane) marked thereon when viewed from the plan or front position by comparison with an oblique, piece assembling viewing position.

FIG. 15 shows the flow of processing in this unit (1'). First, the piece aggregate is distributed as a product such as a puzzle. (This is the piece aggregate distribution step, or S21).

A coupon for accessing the arrangement results output service free of charge a specific number of times is enclosed in the product, with a user ID and password printed as discount information on this coupon.

The user who has purchased the product accesses the specific website of this device (1') from user terminal (3) and inputs the discount information there.

Discount information receiving part (17) receives this discount information (S28) and then the step for inputting the original image (S22) and each step for original image data partition (S23), image comparison (S24), piece arrangement determination (S25), and arrangement results output (S26) are processed as described above in order to access the arrangement results output service.

Then validity of the above-mentioned discount information is assessed by discount information validity assessing part (18).

In specific terms, the user ID and password information stored in the external memory are matched with what has been input to check if this information is correct, and the number of times the service has been used thus far is referenced and if the discount is valid, the amount by which the service should be discounted (or should be free) is found in accordance with the discount information.

Moreover, billing recording part (19) subtracts the discount from the fee to use the surface stored in the external memory, and this is recorded in billing information database (20) together with the member information (ID and password). Nothing needs to be recorded when the service is free.

Created billing information (20) is transmitted to an existing settlement system, by requesting payment from a credit card company or bank withdrawal.

By means of the above-mentioned billing system, it is possible to request that the cost of the arrangement results output service be added to the cost of the product by enclosing the ID and password in the product such that the user who has purchased the product can use it from the start without going through a payment procedure.

On the other hand, it is possible to promote member registration by requesting that a user access the Internet at the time of initial use such that the managers of the service can accumulate customer information.

Furthermore, it is possible to provide to registered members a service for distributing special arrangement tables free of charge in an attempt to promote continuous use of puzzle products and maintain a relationship with the customer.

It is also possible to have means for promoting exchange between the members themselves, such as exchange of discount information between registered members or the purchase of gift coupons.

The above-mentioned billing method can be provided as a system that simply bills to output an arrangement table without necessarily using discount information.

In another embodiment of the invention, shown in FIGS. 27 to 34, each piece is two-face (double-sided) having both front and rear/back image faces. As shown particularly in FIGS. 29*a* and 29*b*, the piece has a "turtle" shape with unique patterning/tonings on front and rear faces. The shape is self-similar by 180 degree rotation and by flips over horizontal or vertical axes; therefore it can be placed in two orientations with front face visible, or in two orientations with the back face visible. The entire set of linked orientations differs by 90 degrees for successive positions horizontally or vertically along orthogonal axes (i.e. turtle head-tail axis vertical for white 'checkerboard' positions, horizontal for black positions). The same identifying symbol appears on both faces aligned with head-tail axis on the front and 90 degrees rotated on the back.

One advantage compared with a set of pieces having only one image face, is that there are twice as many available image faces to display as there are pieces. In any assembled puzzle, half of these image faces are hidden. With proper pairing of front-and-back patternings/tonings, large dark or large light areas can be better depicted, up to an entire pictures being dark, or light.

Furthermore, the puzzle shape of many (six) projections on each piece, interferes less with a shaded tone/patterning over the surface; it has no spectacular/prominent, asymmetric light or dark projecting tabs.

Additionally, when compared with the prior embodiment, printing is simplified as requiring at most one normal imprint per surface, (no additional overlying "varnish" layer to define a specular/preferential reflection).

Furthermore, as the symbol is on the front surface (instead of underlying a varnish layer), when viewed close-up, the symbol is visible from a wider range of viewing angles.

This approach method could be applied to 3-D objects such as cubes wherein the same symbol is marked on all faces but directed differently (at different angles) with an additional code number added to identify the appropriate face/direction more clearly than possible with many small angular changes in symbol direction. (24 combinations are possible: each of 6 faces in each of 4 orientations)

However, it is recognized that some disadvantages relative to the above described single image face embodiment with varnish symbols may arise in that the symbols must be printed on ultimately visible, displayed surfaces of the piece, as discussed below.

Whilst, the approach applies very effectively to tiles images faces with uniform plain backgrounds or uniformly graduated backgrounds, with tiles image faces defined in an orderly way—thus permitting a simple, uniform strategy for pairing front and back image faces—it may be more difficult to use picture areas from, and to find, appropriate pictures for partitioning into divisional areas to form the pieces, pre-existing complex images (as in "let Van Gogh paint your portrait").

As mentioned above, concealing half the image faces of interlocking pieces entails a shape whose visible surface fits only two ways in its area; the set of pieces must have toned/patterned areas brightening through 180 degrees of azimuth rather than 90 degrees. In hiding half the facets the gain, of ability to attend to large dark or light areas, is offset by a loss of facility with finer piece-size detail.

Notwithstanding, it can be arranged that nothing is lost in principle, as, for every piece, the same shaded pattern can be printed on the front as on the back, with a 90-degree rotational difference from one to the other. Thus, each piece has available the "original" four display possibilities of the prior embodiment with the single image face.

In one version, for all tiles, the brightness characteristics of the respective front and rear faces of each tile differ by a same percentage/proportion of the total brightness range of the set, such that the difference in the brightness characteristics is one half of the brightness range, thereby maximizing the potential range or scope of accuracy of brightness reproduction.

For example, for a set of 100 tiles and a total set brightness range of 0 to 199, front and rear image faces of the first tile have average brightness values of 0 (black) and 99 (mid range grey), respectively; while opposite faces of tile 50 have average brightness values of 100 (mid grey) and 199 (white), respectively.

The average brightness of a face is its most important characteristic in terms of a match to a target area:

(1) any half-scale range, e.g. 35 to 135 is completely simultaneously available;

(2) brightness range requirements for pictures tend to be bell-shaped curves; a bright picture may have its maximum high, say at level 140 (on scale of 0 to 199); a dark picture may have its maximum "demand" for average values at, say, 66. (Likewise for parts of large pictures, wherein each part is to be satisfied by one 100-piece set)

(3) With the stated parings above, all faces are simultaneously available in the region in any 100-wide range centered at 50 to 150; in spite of different pictures having different regions of maximum need (in terms of brightness) there is a high-probability of reasonable matches for many target areas throughout such a range centered on maximum demand by the program.

This provides user program selectable groups of different tile brightness ranges available at one time to more accurately reproduce target pictures or, individual tile sets attachable together to form divisional areas of larger composite semblances of the target picture, which are for example, of overall/average relative brightness, of overall medium brightness and overall low brightness (dark). Such selection and matching also renders less visible or effectively masks, join lines which link the adjacent tile sets forming the composite picture together in the assembled composite picture apparently rendering the composite picture seam-free.

The symbols used previously are bold/strong black-and-white designs: mostly abstract/iconic representations of everyday objects. In this embodiment, such a symbol is represented with only a slight disruption of the graduated tone/patterning of the surface to which it is applied by employing the 'Cornsweet illusion'. Only the region of the symbolic object's edge is modified: the border area just outside the object is brightened by a ramp leading up to the edge; conversely, the area just inside is darkened. Up close, the symbols are clearly visible; in distant view, the darkened and brightened bands tend to cancel each other and the overall shaded tone predominates. In processing, the strength of symbol imprint is adjustable, image face to image face.

Figure 32:
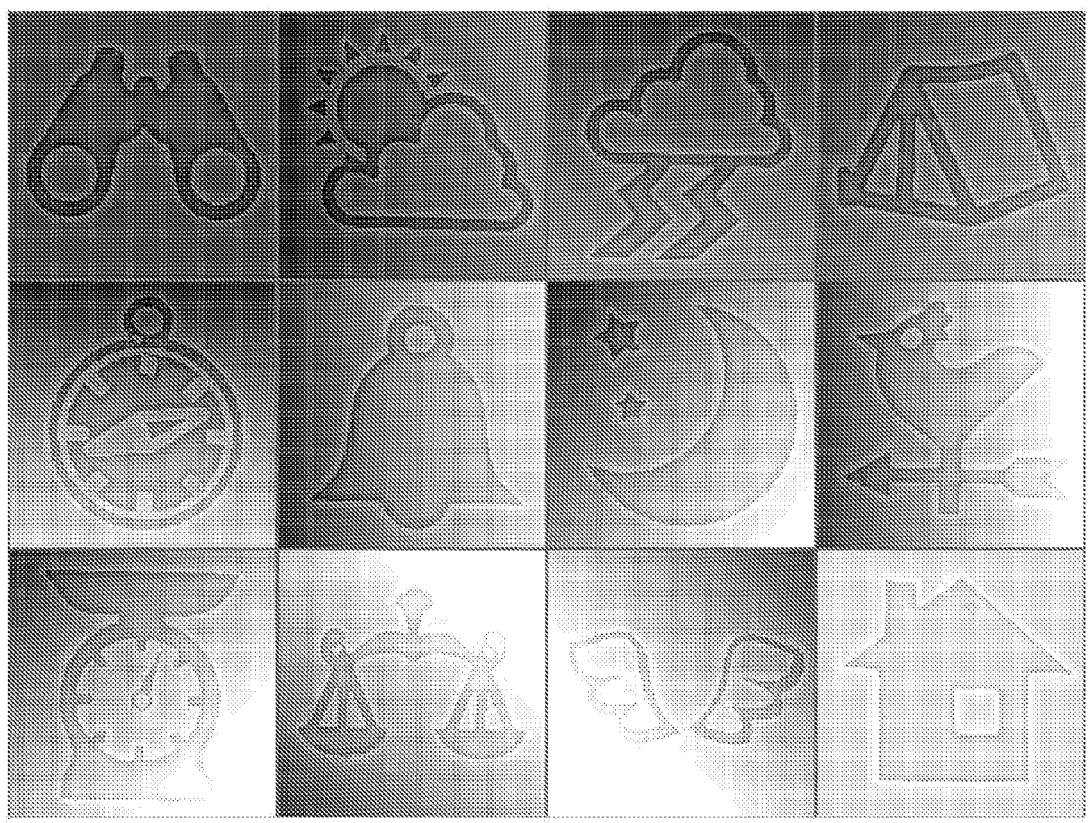
FIG. 32 is a schematic view of a group of different examples of symbols on different piece backgrounds of different patterning directions and brightness levels utilising the "Cornsweet illusion"

As shown in FIG. 32, symbols are applied boldly/emphatically to various background shadings/patternings. The central/internal areas of the symbols are unchanged local background; for those who "see" the illusion, they seem darkened throughout.

Figure 33:
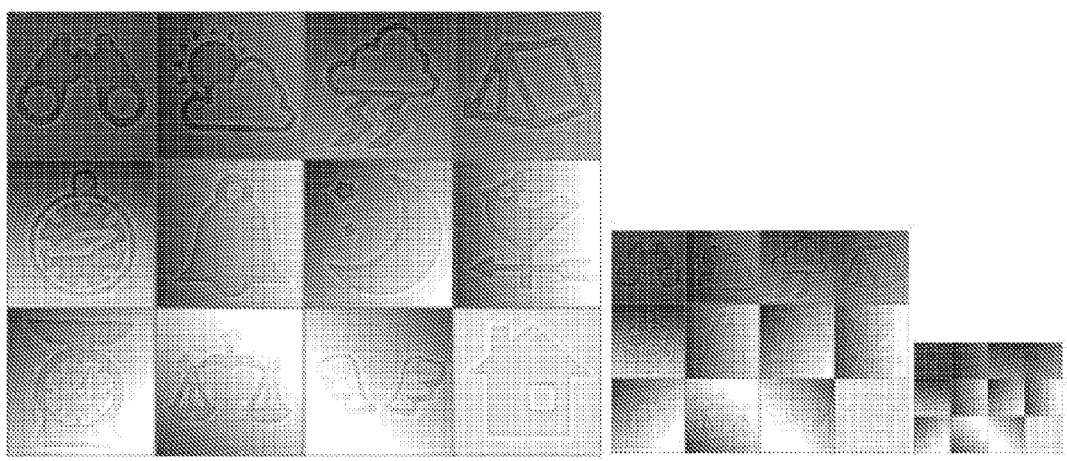
FIG. 33 shows three symbol groups of FIG. 32 at progressively smaller size to illustrate the reduction in visibility of the respective symbols with decreasing size, corresponding to a reduction in symbol visibility with increasing distance from the spectator.

As shown in FIG. 33, smaller versions of these images demonstrate that the identifying symbols tend to fade with viewing distance; they interfere little with these pieces' contributions to the overall image being rendered.

Two examples of sets of are shown:

FIG. 28(*a*) 20-high 14-wide, 280 pieces (compared with 300 of the first embodiment (original JiGaZo).

FIG. 28(*b*) 14-high 10-wide, 140 pieces, larger and fewer, the "children's" set.

By way of example, for the 280-piece set, the front image faces can exhibit the darkest faces (on the left), with corresponding lightest shadings on the backs (on the right). This is suitable, as later demonstrated, for rendering pictures that are overall dark (or light). Although a dozen or more special shadings may be needed, including those that are occasionally needed but seldom used, (two of them would not be paired on the front and rear faces of the same piece).

FIGS. 30 *a* and *b*, respectively, show the Mona Lisa, using sets of 140 and 280 pieces.

Figure 34:
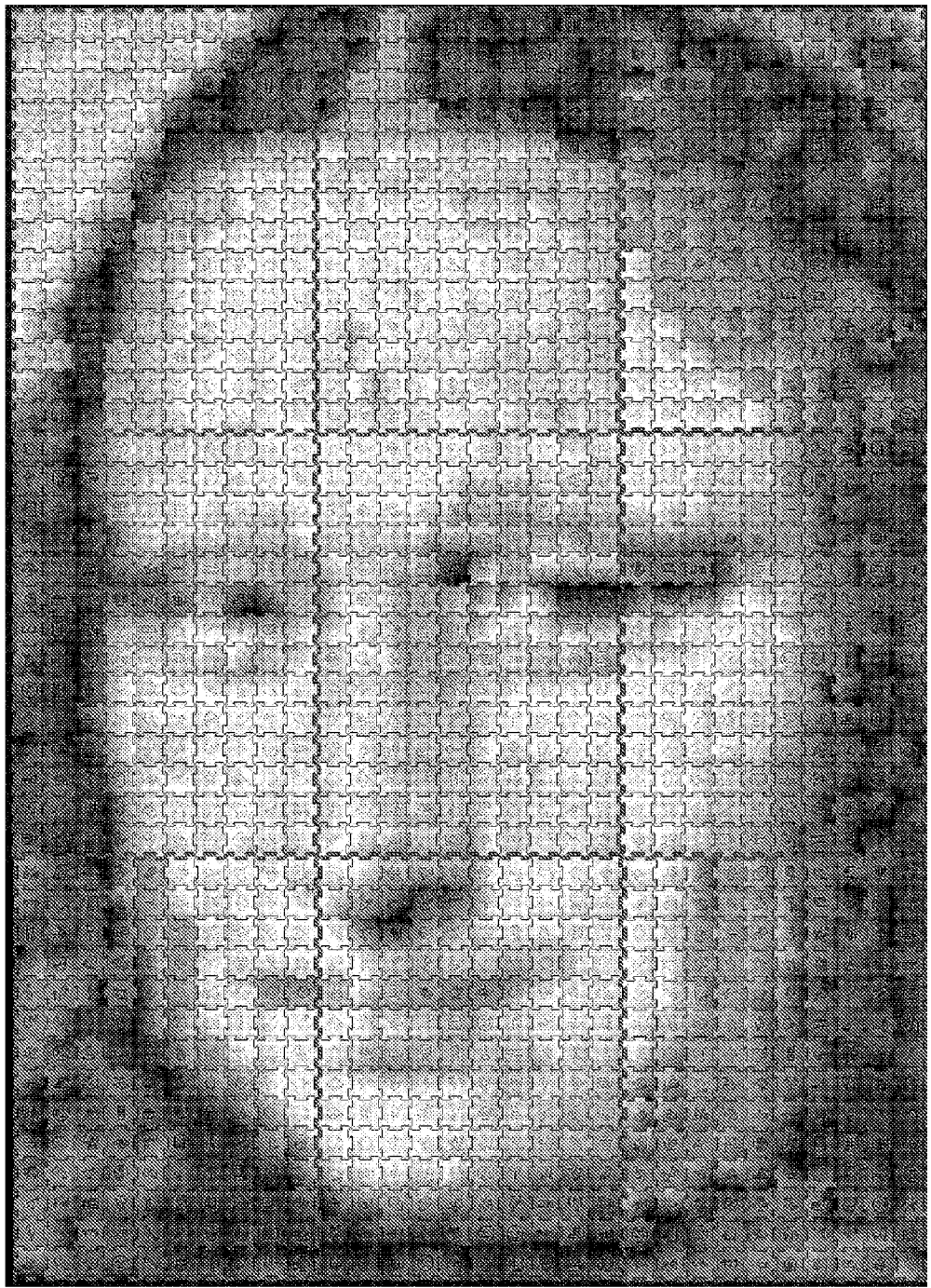
FIG. 34 shows a composite iconic picture formed by nine, individual, two-sided sets, with each set having faces selected to match the average brightness of the particular section of the composite picture occupied by that set; and, FIG. 35 is a schematic illustrating the assembly of a larger puzzle from multiple individual smaller puzzle sets.

Two-face/two-sided pieces facilitate solution of the previous problem of arranging for a huge picture to be formed in sections, each of which is to be satisfied/composed by one complete JiGaZo set. The matching of adjoining edges of adjacent sections is improved appreciably with a much greater set of image faces available, particularly with backs and fronts paired for unequal brightnesses, as discussed above, sections can be of very different overall brightness and match well at the edges because each satisfies well its part of the (relatively unprocessed) target image. FIG. 34 shows the Mona Lisa as target image, cut into nine sections, not otherwise pre-processed, each section rendered by one complete set of 140 pieces. The sections clearly could be interlocked, showing almost no evidence of the joint lines.

The result is not perfect. The top-right section was is so dark overall that lighter-than-desired tile faces had to be employed in the lightest part along its left edge. This problem could be solved by automatic preprocessing target pictures by applying modest soft-edged brightening to large dark areas and likewise applying a soft-edged darkening to large bright areas. (In digital graphics terms, the amplitudes of low spatial frequencies would be decreased; in other words, the choppy waves would be retained but the heights of swells and depths of troughs would be decreased).

For pictures thus sectioned, it might be assumed that for sections to join properly, numbers of rows and columns must both be even—for example, note that in the diagram above, left there are 14 rows and 10 columns, and that multiples of sections like this could join side-by-side or one-above-another. However, this need not be a constraint so long as the program can be arranged to accept the top-left piece as a "black" (or "white") square of a full overlay of a 'checkerboard' pattern, as discussed in the addendum. In other words, the program must given, and must attend to, the (leftcolumn+toprow) parity of this section's (i.e. puzzle set's) location in the whole.

Figure 35:
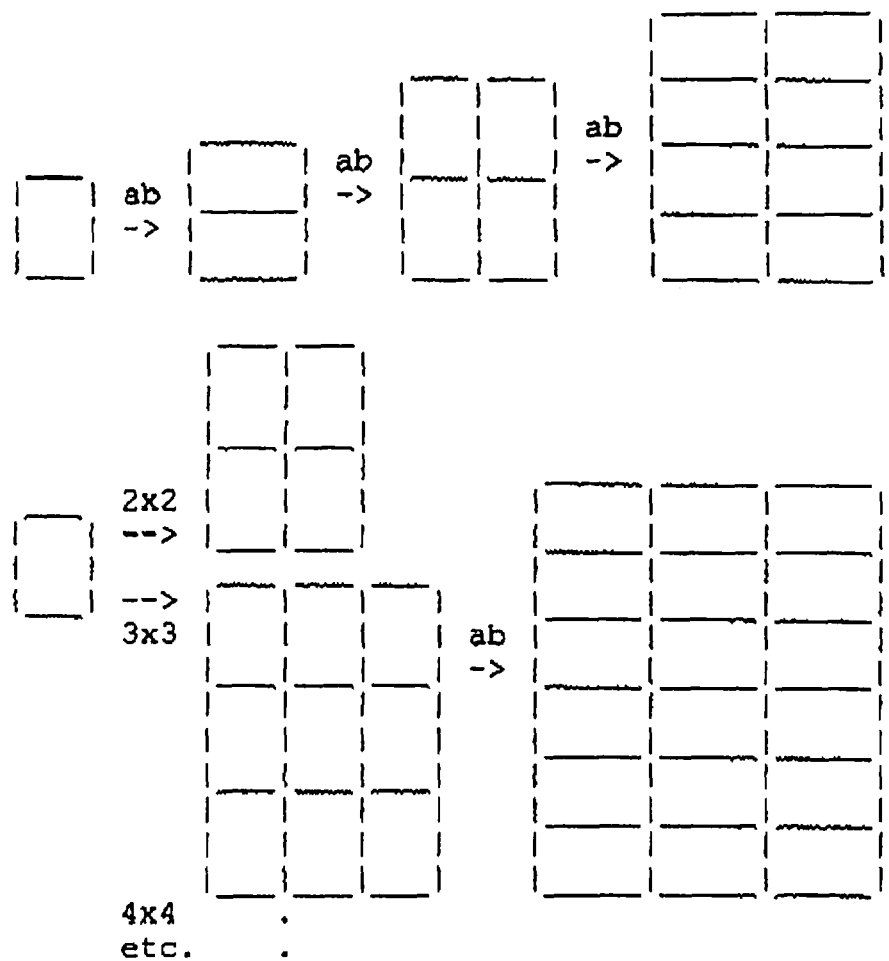

This 5:7 ratio is highly favorable for constructing pictures of almost identical aspect ratio made of one-puzzle-set rectangular panels. Note the possibilities, illustrated by FIG. 35, where larger pictures are made as (1) two panels (operation 'ab' for above-below) of smaller tilings rotated 90 degrees, (2) square numbers ('N×N') of smaller tilings, and (3) any sequence of these two operations, illustrated, for example, by the 6×3 in the bottom right The instruction chart needs to identify each piece and its orientation.

Figure 31A:
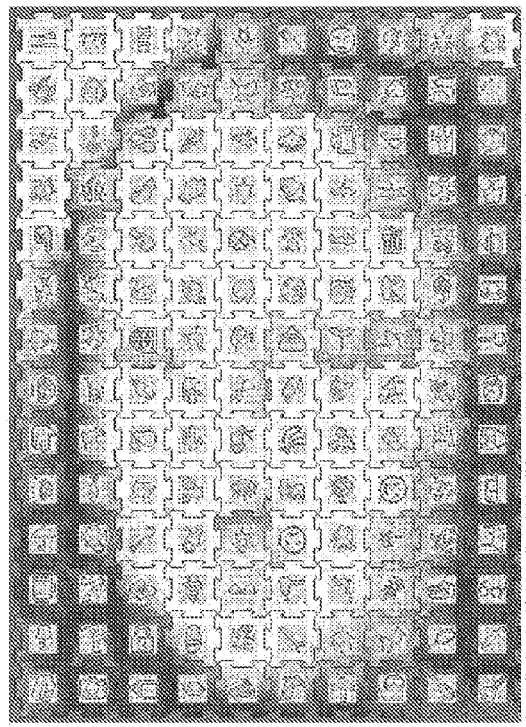
FIGS. 31a and 31b are, respectively, charts showing the symbols required for correct two-sided piece assemblies displaying a partial image of the target picture and only the symbols, respectively.
Figure 31B:
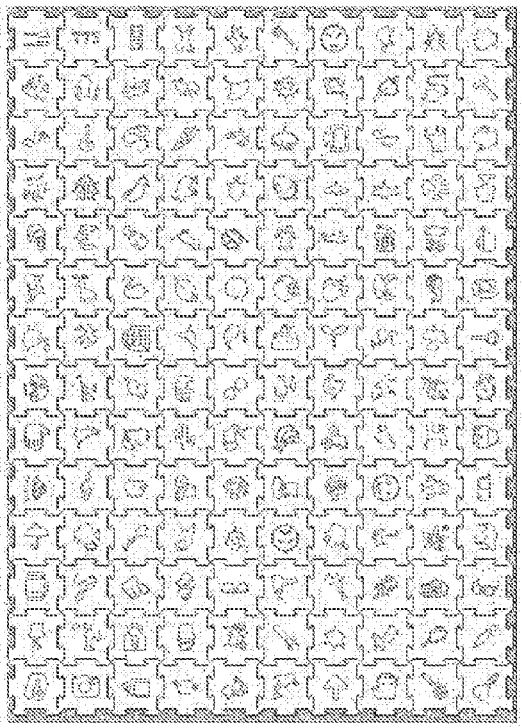

It could accurately depict the final picture but this could detract from the user's joy of assembly. To reduce such possibility, as shown in FIG. 31*a*, a partial pictorial image can be shown or, as shown in FIG. 31*b*, only the identifying symbols and their orientations.

Rendered pictures, according to the first embodiment, have been essentially gray-scale or monochrome tinted as "sepia" or "blue" or "wine-red."] More image faces to choose from provides for better treatment of color pictures because instead of, say, 280 important triplets (of hue/saturation/brightness) for a piece, there are 560 from which to choose 280, provided, of course, that these basic values of front and back of any piece are chosen from widely spaced points in color space, the other values defining direction and rates of change being less important."

Back-front pairings can, for example, be in terms of warm vs. cool colors. This principle can be applied to making tile faces by cutting up/partitioning existing pictures, using a landscape for front sides and a tightly cropped portrait for back sides, assuming that pieces will be cut already interlock-assembled. In a theme such as "let Leonardo paint your portrait", it can be Mona Lisa's face alone on one side and the entire Mona Lisa picture on the other.

Thus, providing images on both faces (front and rear) of a piece sacrifices some distinctive detail on piece-size scale but gains the ability to convey more faithfully larger dark or light regions—up to rendering full pictures as dark or bright. Also, very large pictures can be cut into rectangles, each of which can be constructed by one complete set—conveniently dividing the task among several individuals or groups—a 'JiGaZo' puzzle party idea.

With sets having a very large number of pieces and in the case of the use of multiple sets assembled together to form large composite pictures, the number of computations become undesirably large and can be reduced by comparing only average brightness (ignoring the 3 brightness directions) of each piece and the picture areas in an initial part of the mismatch search, and only when the number of mis-matches so found falls to a predetermined level, reverting to the comparison also of the brightness gradient directions. Such approach reduces the initial number of computations by three with black and white or monochrome and by 5 with color, if only brightness of one color is considered, thereby reducing significantly the computing power/time.

LIST OF REFERENCE NUMBERS

1 Arrangement calculation unit
2 Internet
3 User terminal
11 Original image data input part
12 Original image data partitioning part
13 Image comparison part
14 Piece arrangement determination part
15 Arrangement results output part
16 Piece image database
30 Original image data
31 Regional image data
32 Finished image
33 Arrangement table

Construction and Programming for Two-Sided Pieces

DEFINITIONS

Note that a chessboard's upper-left location (Col 0, row 0) is white. Locations of target squares are likewise considered "WHITE LOCATIONS" if (column+row)modulo 2=0, other locations are called "BLACK LOCATIONS".

MULTI-SET pictures are composed of rectangular SECTIONS, each to be filled with one puzzle set. The top left location of the top-left SECTION is deemed TOP-LEFT-WHITE, as are all other sections whose top left locations are on WHITE locations of an overall checkerboard; other sections are TOP-LEFT-BLACK.

One of the rounded protrusions ("turtle" head or tail) of a physical piece is called the TOP. The FRONT-side image is printed UPRIGHT on the front side of the piece with the TOP uppermost; with the physical piece rotated about a vertical axis, the BACK-side image is printed upright with the piece's TOP still uppermost. With images thus affixed, two other orientations during computation involve the images rotated 180 degrees in the plane; there are four ALTERNATIVE appearances of the piece during computation:

FRONT-SPUN180 - - - flip over vertical axis - - - > BACK-SPUN180
|  |  |
in-plane spin 180 degrees    in-plane spin 180 degrees
|  |  |
FRONT-UPRIGHT - - - flip over vertical axis - - - > BACK-UPRIGHT In programming for two-sided pieces, the differences between (former Jigazo and two-sided pieces), concern three relatively independent areas: 1) target input, 2) piece-target mismatch computation, 3) piece display and output.

1. Target Input (if Multi-Set, One Section Treated at a Time)

The target is input, divided into pieces and shown once in a thereafter unchanging display. Internally, the bitmap data of each BLACK LOCATION area is rotated 90 degrees CW (clockwise) and left in that orientation throughout.

2. Piece-Target Mismatch Computation

Throughout puzzle solving computation all images are thought of as upright or up-side-down. A piece previously had one of four states: rotated 0, 90, 180 or 270 degrees. A two-sided piece like wise has four possible states, which now are FRONT-UPRIGHT, FRONT-SPUN 180, BACK UPRIGHT or BACK-SPUN 180. The mismatch calculation is much as before except that the target bitmap is compared with two separate bitmaps, each UPRIGHT or SPUN 180 (up-side-down)

3. Piece Display and Output

For a display during computation, and for output, we must consider two things: that each piece has two bitmaps, and also that fact that BLACK LOCATION target areas have been rotated 90 degrees clockwise. Thus, display on screen or in the output chart, these are the appropriate operations (where '90' CCW is the 90 degree compensating counter-clockwise counter-spin):
FRONT-UPRIGHT: show front image upright (plus 90 CCW if in BLACK LOCATION)
FRONT-SPUN 180: show " " spun 180 (" " " " " " " ")
BACK-UPRIGHT: show back image upright (" " " " " " " ")
BACK-SPUN 180: show "Image spun 180 (" " " " " " " ")

The invention claimed is:

1. A personalized mosaic puzzle source tile set for user assembly in their entirety into a copy of most user provided target pictures, comprising:
   a predetermined, limited number of puzzle source tiles of identical size and shape;
   each source tile having a front, image forming face bounded by respective edge portions and being rotationally symmetrical, enabling assembly in at least two different rotational positions with image forming faces in edge-to-edge abutment;
   the image forming faces having respectively different patternings extending thereacross providing, collectively, a brightness range for the set and, individually, respectively different brightness characteristics distributed over the brightness range;
   the brightness characteristics comprising a level of average brightness and, at respective predetermined designated edges of each individual face, a level of maximum brightness and a level of minimum brightness, respectively;
   indicia marked on at least one of a respective front face and a respective rear face of all respective source tiles, said indicia providing respectively different tile identification codes providing directional characteristics corresponding to the respective rotational positions, whereby a user can assemble the source tiles together in correct rotational positions to form a copy of the target picture by following directions provided by corresponding, correctly positioned indicia on a source tile arrangement chart.

2. A personalized mosaic puzzle set according to claim 1 wherein the pieces are solid and the indicia are marked on the front, image forming faces and have surfaces having one of a different reflection rate, gloss and roughness from the patterning so that the identification codes can be seen when viewed during assembly from one of an oblique angle and in a direct light, but become indistinct when the assembled mosaic image is viewed from one of the front and in indirect light, respectively.

3. A personalized mosaic puzzle set according to claim 1 wherein the pieces are solid and, the indicia are marked on the front, image forming faces and have a surface of clear varnish and the set includes a container of a similar varnish.

4. A personalized mosaic puzzle set according to claim 1 wherein the patterning is in three primary colors.

5. A personalized mosaic puzzle set according to claim 4 wherein the primary colors are red, green and blue.

6. A personalized mosaic puzzle set according to claim 1 further comprising a set of instructions with at least one of either a remote or web site address, in combination with an access code for uploading the user provided image to the site and downloading the assembly directions.

7. A personalized mosaic puzzle set according to claim 1 further comprising a piece-supporting and aligning placement tray, marked with a tile placement grid with orthogonal axis coordinates for supporting individual solid source tiles, during their assembly.

8. A personalized mosaic puzzle set according to claim 1 wherein the source tiles of the set are in a humped histogram population distribution with more source tiles located in middle divisions of the range of brightness than in extreme divisions corresponding to maximum average brightness and minimum average brightness.

9. A personalized mosaic puzzle set according to claim 1 wherein the patternings vary progressively and smoothly across image faces between the predetermined designated edges of individual source tiles and the brightness characteristics of the image forming faces comprise respectively different, predetermined, combinations of three brightness appearance characteristics comprising the level of average brightness, direction of a brightness gradient and magnitude of a brightness gradient.

10. A mosaic puzzle tile set according to claim 9 wherein directions of brightness gradients of all source tiles are all in a same rotational sector.

11. A mosaic puzzle tile set according to claim 10 wherein each brightness gradient is formed by a brightness plane of constant inclination sloping in two transverse directions.

12. A mosaic puzzle tile set according to claim 10 wherein the directions of the brightness gradients of all source tiles span the entire rotational sector.

13. A personalized mosaic tile set according to claim 9 wherein directions of brightness gradients of all source tiles are all in a same rotational sector; and,
wherein each brightness gradient is formed by a brightness plane of constant inclination sloping in two transverse directions.

14. A personalized mosaic tile puzzle set according to claim 13 wherein the indicia have a surface of clear varnish and the set includes a container of a similar varnish.

15. A personalized mosaic tile set according to claim 1 wherein respective edges of source tiles form protrusions and recesses for interlocking with complementary recesses and protrusions of abutting source tiles.

16. A personalized mosaic tile set according to claim 1 wherein all the puzzle source tiles are divisional areas of a single predetermined picture.

17. A personalized mosaic tile puzzle set according to claim 1 wherein the puzzle tiles are virtual, being images displayed on a screen for assembly according to a virtual arrangement chart.

18. A personalized mosaic tile puzzle set according to claim 1 further, including one of a single additional identical puzzle set and or three additional identical puzzle sets, thereby providing a double number of available tiles or and a quadruple number of available tiles, respectively, so that the tiles of all sets can be assembled together to form a correspondingly larger mosaic semblance of a same target picture than the tiles of a single set.

19. A personalized mosaic tile puzzle set according to claim 18 wherein for one additional set, the number of tiles within each set is 315 and can combined for assembly in a 21×30 mosaic tile array which has a same aspect ratio as a mosaic of 15×21 being assembled from tiles of a single set.

20. A personalized mosaic tile puzzle set according to claim 18 wherein for three additional sets, the number of tiles within each set is 300, for a total of 1200 tiles in number.

21. A personalized mosaic puzzle set according to claim 1 wherein the puzzle pieces are cubes and comprise different appearance characteristics on respectively different faces.

22. A personalized mosaic puzzle set according to claim 1 wherein the tiles also have rear, image forming faces bounded by the respective edge portions and having respectively different patterning both from each other and from the front faces which patterning varies progressively and smoothly across the rear image faces, defining a level of average brightness and, at respective predetermined designated edges of each individual face, a level of maximum brightness and a level of minimum brightness, respectively; providing respectively different brightness characteristics distributed over the brightness range;
wherein both a respective front and rear of all respective source tiles are marked with indicia providing respectively different tile face identification codes providing directional characteristics; and,
such that the source tiles can be assembled together in correct rotational positions with any tile exposing a front or a rear face to form the copy of the target picture by following the directions provided by indicia on the source tile arrangement chart.

23. A personalized mosaic puzzle set according to claim 22 wherein for all tiles, the average brightness characteristics of the respective front and rear faces of each tile differ by a same percentage/proportion throughout the total brightness range of the set so as to distribute the available average brightnesses evenly throughout the set.

24. A personalized mosaic puzzle set according to claim 23 wherein the difference in the average brightness characteristics is one half of the brightness range.

25. A personalized mosaic puzzle set according to claim 22 wherein the predetermined edges at which the patterning defines a level of maximum brightness and a level of minimum brightness are common to the front and rear faces of each tile.

26. A personalized mosaic puzzle set according to claim 22 wherein the tile edge portions form interlocking protrusions and recesses for interlocking with complementary recesses and protrusions of abutting source tiles with one set of opposite edge portions of respective tiles being identical in shape and another set of opposite edge portions, orthogonal to the one set, also being identical and of complementary shape to the opposite edge portions of the one set, enabling the tiles to be linked to adjacent tiles when flipped/turned over about either of two orthogonal axes.

27. A personalized mosaic puzzle set according to claim 22 wherein each indicia comprises a symbol which is defined by an outline, darker than the average brightness of the background face and bordered on an inside for a majority of its length by a band darker than the average darkness of the face and bordered on an outside for a majority of its length by a band brighter than the average brightness of the face so that the symbol becomes less visible in the context of the semblance of the target picture as the distance of a spectator from the picture increases, in accordance with the 'Cornsweet illusion'.

28. A personalized mosaic puzzle set according to claim 22 wherein the identifying indicia on respective opposite faces of each piece are identical and differently
oriented according to the face of the piece.

29. A system for providing, automatically, user instructions for assembling mosaic tile copies of most target pictures selected personally by a user comprising:
a personalized mosaic puzzle source tile set for user assembly into a copy of most user provided target pictures, comprising:
a predetermined, limited number of puzzle source tiles of identical size and shape;
each source tile having a front, image forming face bounded by respective edge portions and being rotationally symmetrical, enabling assembly in at least two different rotational positions with image forming faces in edge-to-edge abutment;
the image forming faces having respectively different patternings extending thereacross providing, collectively, a brightness range for the set and, individually, respectively different brightness characteristics distributed over the brightness range;
the brightness characteristics comprising a level of average brightness and, at respective predetermined designated edges of each individual face, a level of maximum brightness and a level of minimum brightness, respectively;
indicia marked on at least one of a respective front face and a respective rear face of all respective source tiles, said indicia providing respectively different tile identification codes having directional characteristics corresponding to the respective rotational positions,
whereby a user can assemble the source tiles together in correct rotational positions to form a copy of the target picture by following directions provided by corresponding, correctly positioned indicia on a source tile arrangement chart;
a data store retaining mathematical values of size, shape and brightness appearance characteristics of all source tiles of the set;
means for receiving any user selected target picture;
means for automatically dividing the received target picture into a set of a same number of target picture areas of identical value of size and shape to source tiles; measuring/calculating corresponding mathematical values of brightness appearance characteristics for all target picture areas; comparing the measured/calculated values for respective picture areas with the stored values for respective source tiles; and means for assigning respective source tiles images to locations of respective target picture areas on the basis of respective least different values of brightness appearance characteristics between an assigned tile image and a target picture area at the location;
means for outputting/displaying the assigned positions of the tile assignments as the source tile arrangement chart with the assigned source tiles being identified by their identification codes.

30. A system according to claim 29 wherein the patterning varies progressively and smoothly across image faces between the predetermined designated edges of individual source tiles and the brightness appearance characteristics consist of average brightness, direction of a brightness gradient and magnitude of a brightness gradient with each brightness gradient formed by a brightness plane of constant inclination.

31. A system according to claim 30 wherein, prior to assigning respective source tiles to respective target picture areas, values of the respective directions of the brightness gradients of respective source tiles images and the respective brightness gradients of respective target image areas are mathematically adjusted so that the directions of the brightness gradients of the source tiles images and the brightness gradients of the target image areas are effectively rotated to all lie in a same rotational sector and,
when tile assigning is completed, for reversing the mathematical adjustments of the respective directions of the brightness gradients of the source tiles images and of the target picture areas by adding mathematical values required for the reversal to the respective corresponding values of the directions of brightness gradient of the respectively assigned source tile images and of the target picture areas, thereby effectively rotating the source tiles images and the picture image areas back to the original rotational positions of the respective picture image areas in the assigned positions.

32. A system according to claim 29 wherein the assigning means initially assigns arbitrarily source tiles images to target picture areas and iteratively, for all target picture areas, provisionally assigns source tiles images to respective different target picture areas and calculates, mathematically, respective mismatch values between respective combinations of values of pairs of respective individual source tiles images and values of respective individual target picture areas to which those source tiles images are provisionally assigned and calculates prospective corresponding mismatch values if the provisionally assigned source tiles images are exchanged for each other;
exchanges the source tiles images for each other when the sum of said mismatch values would be reduced by the exchange; and
when exchanges would no longer reduce the sum of said mismatch values, providing one of a display of all the source tile images in their respective assigned positions forming the recognizable mosaic copy of the user selected target image and user instructions for assembling the mosaic copy of the user selected target picture.

33. A method for either assembling, automatically, a recognizable mosaic copy of any target picture selected personally by a user or, alternatively, for providing, automatically, user instructions, for assembling such mosaic copy, comprising the initial alternative steps of:
either providing a computer data base with data representing a predetermined set of a number of source image tiles defined by predetermined, respectively different, combinations of three mathematical values of appearance characteristics, comprising average brightness, direction of a brightness gradient and magnitude of a brightness gradient;

or, automatically dividing, a source image into a set of a number of virtual source image tiles and measuring and storing respective tiles images' respective combinations of three mathematical values of appearance characteristics, comprising average brightness, direction of a brightness gradient and magnitude of a brightness gradient;

and comprising the subsequent steps of:

automatically dividing, the target picture into a set of a same number of target picture areas, all source image tiles being of equal size and shape both to each other and to all target picture areas, and being rotationally symmetrical such that each source image tile can be positioned in a plurality of alternative rotational positions, respectively, with all tiles images in edge-to-edge abutment;

assigning, automatically, respective source tiles images to locations of respective target picture areas by initially assigning arbitrarily source tiles images to target picture areas and iteratively, for all target picture areas, provisionally assigning source tiles images to respective different target picture areas;

automatically calculating, mathematically, the respective mismatch values between respective combinations of values of pairs of respective individual source tiles images and values of respective individual target picture areas to which those source tiles images are provisionally assigned and, automatically, calculating prospective corresponding mismatch values when the provisionally assigned source tiles images were exchanged for each other;

exchanging, automatically, the source tiles images for each other when the sum of said mismatch values would be reduced by the exchange; and when exchanges would no longer reduce the sum of said mismatch values, providing, automatically, one of a display of all the source tile images in their respective assigned positions forming the recognizable mosaic copy of the user select target image and user instructions for assembling the mosaic copy of the user selected target picture.

* * * * *